(12) United States Patent
Honda

(10) Patent No.: US 9,287,042 B2
(45) Date of Patent: Mar. 15, 2016

(54) WINDING DEVICE AND WINDING METHOD FOR EDGEWISE COIL

(71) Applicant: NITTOKU ENGINEERING CO., LTD., Saitama-shi, Saitama (JP)

(72) Inventor: Hidemitsu Honda, Fukushima (JP)

(73) Assignee: NITTOKU ENGINEERING CO., LTD., Saitama (JP)

( * ) Notice: Subject to any disclaimer, the term of this patent is extended or adjusted under 35 U.S.C. 154(b) by 331 days.

(21) Appl. No.: 13/916,178

(22) Filed: Jun. 12, 2013

(65) Prior Publication Data

US 2013/0333432 A1 Dec. 19, 2013

(30) Foreign Application Priority Data

Jun. 13, 2012 (JP) ................................. 2012-133662

(51) Int. Cl.
*H01F 41/06* (2006.01)
*H01F 27/28* (2006.01)

(52) U.S. Cl.
CPC ........ *H01F 41/0612* (2013.01); *H01F 27/2847* (2013.01); *H01F 41/065* (2013.01); *H01F 41/067* (2013.01); *H01F 41/0687* (2013.01)

(58) Field of Classification Search
CPC ............ H01F 41/0604; H01F 41/0654; H01F 41/0658; H01F 41/067; H01F 41/065; H01F 41/0687; H01F 27/2847; H01F 41/06; H01F 41/0612; B21F 3/04; B21F 3/08; B21D 11/06; B65H 75/18
See application file for complete search history.

(56) References Cited

U.S. PATENT DOCUMENTS

2010/0212771 A1* 8/2010 Fubuki et al. ................. 140/102
2010/0319802 A1 12/2010 Hattori

FOREIGN PATENT DOCUMENTS

| EP | 2251959 A1 | 11/2010 |
| EP | 2315220 A1 | 4/2011 |
| EP | 2387048 A2 | 11/2011 |
| JP | 200455920 A | 2/2004 |
| JP | 2007-074881 A | 3/2007 |
| JP | 4278700 B1 | 3/2009 |
| JP | 2009-302245 A | 12/2009 |

(Continued)

OTHER PUBLICATIONS

Search Report issued May 29, 2014, corresponds to Taiwanese patent application No. 102120664.

(Continued)

*Primary Examiner* — Debra Sullivan
(74) *Attorney, Agent, or Firm* — Hauptman Ham, LLP

(57) ABSTRACT

A winding device includes a bending mechanism for bending a rectangular wire, a feed mechanism for feeding the rectangular wire, a coil guide for supporting an edgewise coil formed by alternately repeating the feeding of the rectangular wire by the feed mechanism and the bending of the rectangular wire by the bending mechanism, and a coil-guide moving mechanism for moving the coil guide while rotating the coil guide. The coil guide includes a guide column to be brought into engagement with an inner circumference of a first coil portion having a cylindrical shape, and a guide base on which a second coil portion is to be placed, the second coil portion having a cylindrical shape connected to the first coil portion through a connecting wire and having a center axis that is shifted in position from a center axis of the first coil portion to form a stepwise shape.

4 Claims, 25 Drawing Sheets

(56) References Cited

FOREIGN PATENT DOCUMENTS

| | | |
|---|---|---|
| TW | I313471 B | 8/2009 |
| WO | 2009107633 A1 | 9/2009 |

OTHER PUBLICATIONS

Extended European Search Report dated Nov. 25 2013, corresponds to European patent application No. 13171371.1.

* cited by examiner

WINDING DEVICE AND WINDING METHOD FOR EDGEWISE COIL

TECHNICAL FIELD

The present invention relates to a winding device and a winding method for an edgewise coil.

DESCRIPTION OF RELATED ART

In order to improve efficiency of utilization of a space for winding when a coated copper wire is wound in a coil-like shape, there has conventionally been proposed a winding device for an edgewise coil, which is configured so that a rectangular wire having a rectangular cross section is sequentially bent so as to be vertically wound (the rectangular wire is wound in a width direction) to form an edgewise coil (see Japanese Patent Application Laid-open No. 2009-302245). The rectangular wire, which is fed to have a predetermined length at a portion thereof, is sandwiched between a fulcrum roller rotating about a shaft and a bender provided on an outer circumference of the fulcrum roller. The bender is turned about the fulcrum roller to bend the rectangular wire at 90 degrees. Next, the rectangular wire is fed by a predetermined length again. The bender is turned about the fulcrum roller again to bend the rectangular wire at 90 degrees. The above-mentioned operation is repeated to manufacture the edgewise coil.

For actual use of the edgewise coil described above, two edgewise coils are formed in parallel, and the two parallel edgewise coils are connected. Therefore, conventionally, two edgewise coils are respectively formed with separate windings. Then, ends of the windings, which are to be connected, are welded together through a communication terminal. In recent years, however, two edgewise coils arranged in parallel are required to be formed by edgewise winding of a single rectangular wire.

As a device for the above-mentioned formation of the two edgewise coils, the following linked coil formation device has been proposed. Specifically, the linked coil formation device includes a first coil winding processing line having a first winding head for sequentially winding one end part of a coil material made of a rectangular wire into a rectangular shape to form a first coil part into a shape of a rectangular cylinder, a second coil winding processing line having a second winding head for forming a second coil part into the shape of the rectangular cylinder at the other end part of the coil material and for arranging the second coil part to be adjacent to the first coil part on an identical face, and a material transfer unit for conveying the coil material having the first coil part formed in the first coil winding processing line into the second coil winding processing line on an extension of each of the first and second coil winding processing lines at an opposite side of the material feed area (see International Patent WO2009/107633A).

However, in the conventional linked coil formation device, the two winding processing lines, each being capable of individually forming the edgewise coil, are connected by the material transfer unit. Specifically, the linked coil formation device described above has a structure in which the two independent edgewise coil formation devices are connected. Therefore, the size of the linked coil formation device is remarkably increased. Thus, in order to install the linked coil formation device, an area equal to or larger than an area, on which at least two independent edgewise coil formation devices can be installed, is required.

SUMMARY OF THE INVENTION

It is an object of the present invention to provide a winding device and a winding method for an edgewise coil, which are capable of continuously forming a first coil portion having a cylindrical shape and a second coil portion having a cylindrical shape connected to the first coil portion through a connecting wire to obtain such an edgewise coil that a position of a center axis of the first coil portion and that of a center axis of the second coil portion are shifted from each other to form a stepwise shape.

According to one aspect of the present invention, a winding device for an edgewise coil is provided. The winding device comprises a bending mechanism for bending, in a direction within a horizontal plane, a rectangular wire fed from a wire supply source in a horizontal direction, a feed mechanism for feeding a preset length of the rectangular wire from the wire supply source toward the bending mechanism, a coil guide for supporting an edgewise coil, from below, the edgewise coil being formed by alternately repeating the feeding operation for the rectangular wire by the feed mechanism and the bending operation for the rectangular wire by the bending mechanism, the edgewise coil being lowered under its own weight, and a coil-guide moving mechanism for moving the coil guide following movement of the edgewise coil by the feeding operation of the feed mechanism, and for moving the coil guide while rotating the coil guide following the movement of the edgewise coil by the bending operation of the bending mechanism, wherein the coil guide comprises a guide column to be brought into engagement with an inner circumference of a first coil portion having a cylindrical shape constituting the edgewise coil and a guide base on which a second coil portion is to be placed, the second coil portion having a cylindrical shape connected to the first coil portion through a connecting wire so as to constitute the edgewise coil together with the first coil portion.

According to another aspect of the present invention, a winding method for an edgewise coil is provided. The winding method comprises a first coil formation step of alternately repeating an operation of feeding a rectangular wire from a wire supply source and an operation of bending the rectangular wire to form a first coil portion having a cylindrical shape, a connecting-wire formation step of forming a connecting wire from a part of the rectangular wire, which is fed from the wire supply source after the formation of the first coil portion, and a second coil formation step of sequentially bending a part of the rectangular wire, which is fed from the wire supply source after the formation of the connecting wire, in the same direction to form a second coil portion having a cylindrical shape connected to the first coil portion through the connecting wire, wherein the first coil formation step comprises supporting the first coil portion by a guide column to be brought into engagement with an inner circumference of the first coil portion to move in synchronization with the formation of the first coil portion, and the second coil formation step comprises placing the second coil portion on a guide base that moves together with the guide column so as to move the guide base in synchronization with the formation of the second coil portion.

PREFERRED EMBODIMENTS OF THE INVENTION

In the following, an embodiment of the present invention is described referring to the accompanying drawings.

Figure 7:
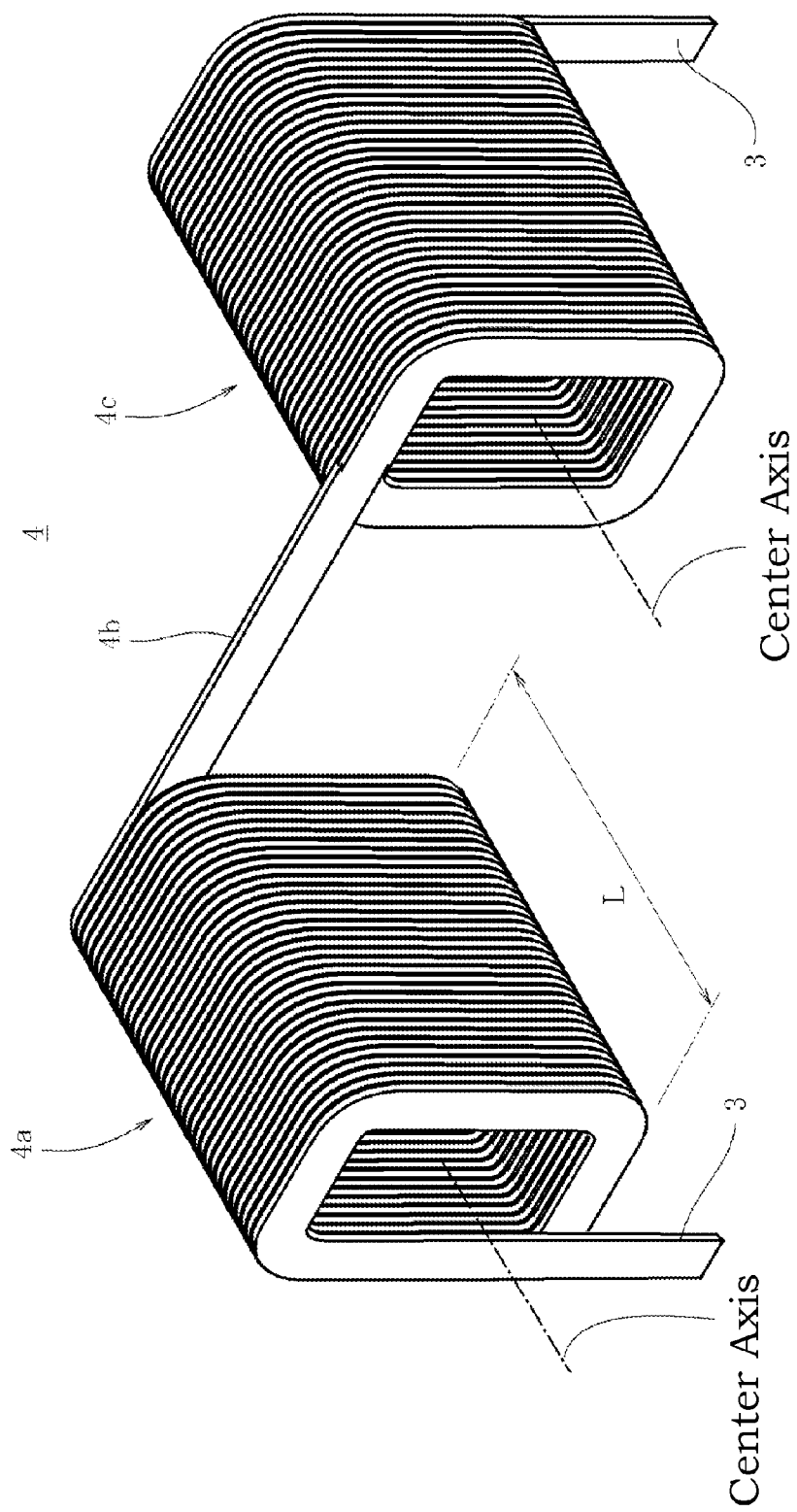
FIG. 7 is a perspective view of an edgewise coil obtained by the winding device according to the embodiment of the present invention.

FIG. 7 illustrates an edgewise coil 4 (hereinafter also referred to simply as "coil 4") obtained by a winding device 1 for an edgewise coil according to the embodiment of the present invention. The edgewise coil 4 includes a first coil portion 4a having a rectangular cylindrical shape and a second coil portion 4c having a rectangular cylindrical shape, which is connected to the first coil portion 4a through a connecting wire 4b. A position of a center axis of the first coil portion 4a and that of a center axis of the second coil portion 4c are shifted from each other, and hence the edgewise coil 4a is formed into a stepwise shape. The first coil portion 4a and the second coil portion 4c are obtained by alternately repeating feeding of a rectangular wire 3 as a wire and bending of the rectangular wire 3 in a width direction. FIG. 7 illustrates the edgewise coil 4 formed in the following manner. Specifically, the rectangular wire 3 is bent at 90 degrees for each time, and the feeding and the bending in the same direction are repeated four times for the rectangular wire 3 to form one turn of the rectangular wire 3.

Figure 1:
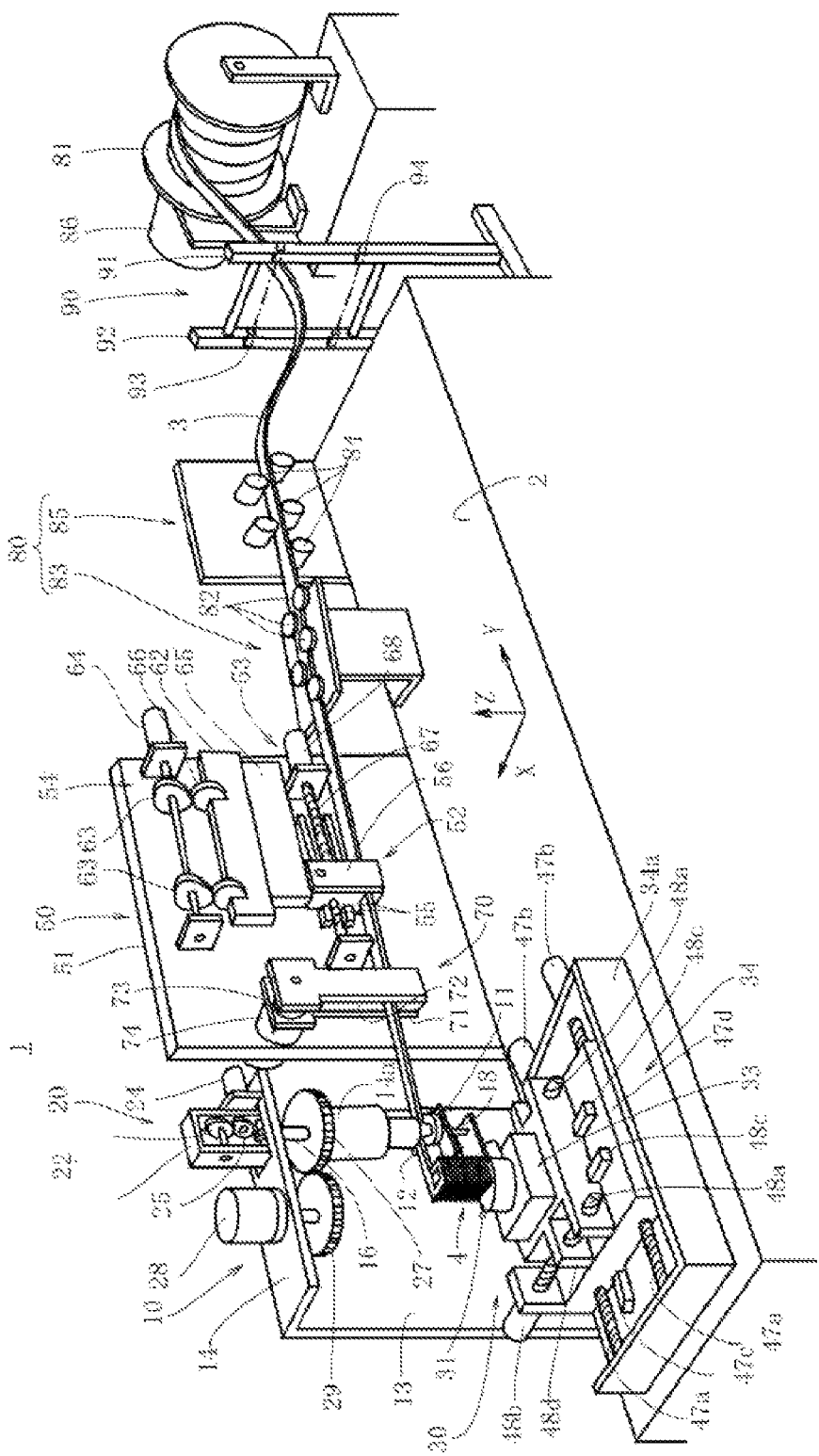
FIG. 1 a perspective view illustrating a schematic configuration of a winding device according to an embodiment of the present invention.

FIG. 1 illustrates the winding device 1. The winding device 1 includes a spool 81, a bending mechanism 10, a feed mechanism 50, and a presser mechanism 70. The spool 81 is provided as a wire supply source. The bending mechanism 10 is provided as bending means for bending the rectangular wire 3 at a predetermined angle, for example, at 90 degrees in a direction within a horizontal plane while holding the rectangular wire 3 fed from the spool 81 in a horizontal direction between a main clamp 11 and a bender 12. The feed mechanism 50 is provided as feed means for feeding the rectangular wire 3 from the spool 81 by a preset length toward the bending mechanism 10. The presser mechanism 70 is provided between the feed mechanism 50 and the bending mechanism 10 as presser means for clamping the part of the rectangular wire 3 which is fed by the feed mechanism 50 toward the bending mechanism 10 so as to prevent the rectangular wire 3 from being drawn toward a downstream side by the bending operation of the bending mechanism 10. Corresponding to a winding operation performed by the bending mechanism 10, the feed mechanism 50 is configured to feed, to the bending mechanism 10, the rectangular wire 3 to have a predetermined length at a portion thereof corresponding to a size of each side of the edgewise coil 4 for each time.

The winding device 1 for the edgewise coil further includes a correction unit 80. The correction unit 80 includes a vertical straightener portion 85 and a horizontal straightener portion 83. The vertical straightener portion 85 includes a plurality of guide rollers 84 arranged in a zigzag pattern to sandwich the rectangular wire 3 fed from the spool 81 therebetween in a thickness direction of the rectangular wire 3 to correct the rectangular wire 3 in the thickness direction. The horizontal straightener portion 83 includes a plurality of guide rollers 82 arranged in a zigzag pattern to sandwich the rectangular wire 3 fed from the spool 81 therebetween in a width direction of the rectangular wire 3 so as to correct the rectangular wire 3 in the width direction.

The spool 81 is provided so as to be rotatable by an electric motor 86. A feeding detection unit 90 for detecting feeding of the rectangular wire 3 is provided between the spool 81 and the correction unit 80. The feeding detection unit 90 includes a pair of supporting columns 91 and 92, an upper-limit sensor 93, and a lower-limit sensor 94. The supporting columns 91 and 92 sandwich the part of the rectangular wire 3 fed from the spool 81 therebetween in the width direction. The upper-limit sensor 93 and the lower-limit sensor 94 are provided to the pair of supporting columns 91 and 92 to detect a deflection of the rectangular wire 3. When the upper-limit sensor 93 detects a reduction in the amount of deflection of the rectangular wire 3, the electric motor 86 rotates the spool 81 to feed the rectangular wire 3. When the lower-limit sensor 94 detects an increase in the amount of deflection of the rectangular wire 3, the electric motor 86 stops the rotation of the spool 81 to stop the further feeding of the rectangular wire 3. The bending mechanism 10, the feed mechanism 50, the presser mechanism 70, and the correction unit 80 are mounted to a table 2 serving as a base, whereas the feeding detection unit 90 is provided adjacent to the table 2.

The rectangular wire 3 is delivered from the spool 81 through the correction unit 80, the feed mechanism 50, and the presser mechanism 70 to the bending mechanism 10. Then, the rectangular wire 3 is wound into the edgewise coil 4 by the bending mechanism 10. In the following, for description, a direction along the rectangular wire 3 from the spool 81 to the bending mechanism 10 is referred to as a Y-axis direction, a direction within the plane at a right angle to the rectangular wire 3 is referred to as an X-axis direction, and a vertical direction orthogonal to the Y-axis direction and the X-axis direction is referred to as a Z-axis direction.

(Feed Mechanism 50)

The feed mechanism 50 includes a plurality of guides 55, a clamp 52, a driving mechanism 53, and a clamp actuation mechanism 54. The guides 55 are provided to a vertical plate 51 having a lower end fixed to a side surface of the table 2, and extend in the Y-axis direction. The clamp 52 is movable in a reciprocating manner along the guides 55 and comes into engagement with the rectangular wire 3 in the thickness direction when moving forward toward the bending mechanism 10. The driving mechanism 53 moves the clamp 52 in a reciprocating manner. The clamp actuation mechanism 54 is provided as clamp actuation means for actuating the clamp 52 so that the clamp 52 comes into engagement with the rectangular wire 3 when the clamp 52 is moved forward by the driving mechanism 53, and for disengaging the clamp 52 from the rectangular wire 3 when the clamp 52 is moved backward.

Figure 2:
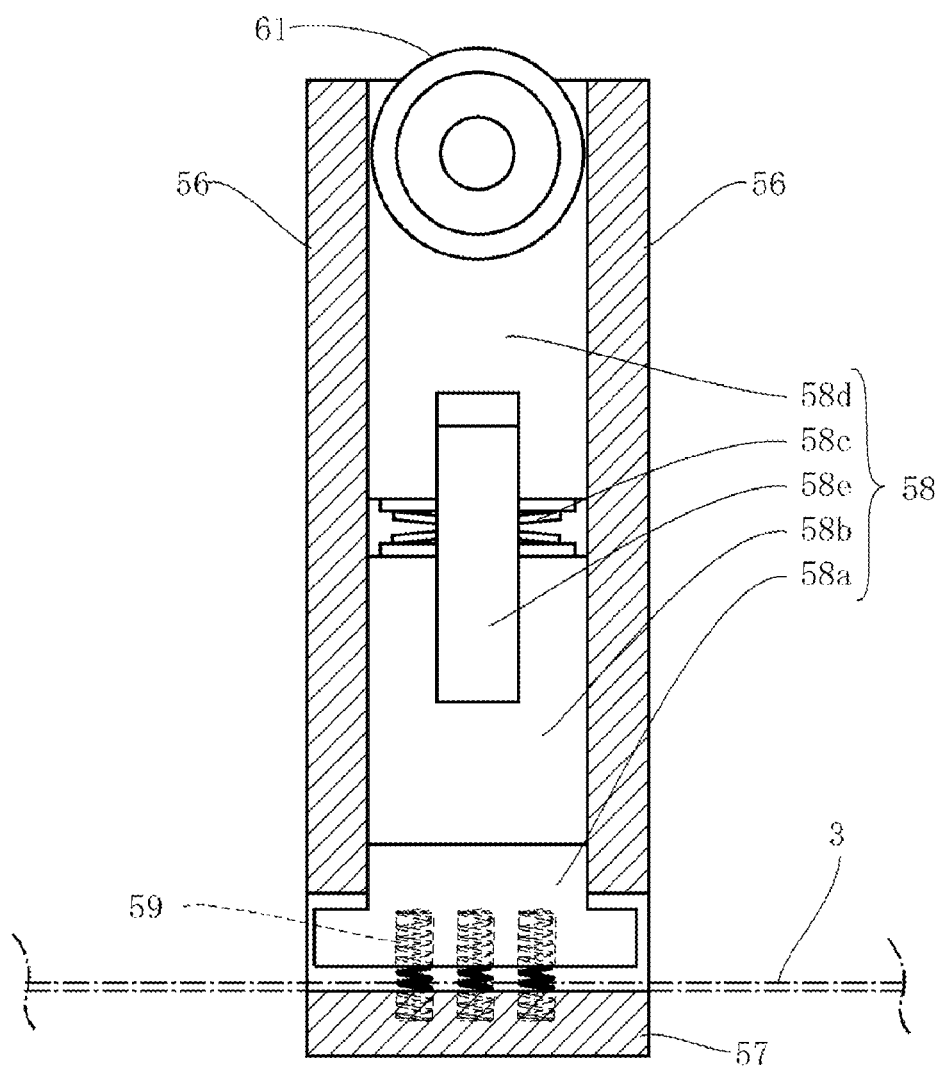
FIG. 2 is a schematic sectional view of a clamp.

The clamp 52 is configured to vertically sandwich the rectangular wire 3 and to be guided by the plurality of guides 55 so as to be movable in a reciprocating manner in the Y-axis direction. As illustrated in FIG. 2, the clamp 52 includes a main body portion 56 having a cylindrical shape, and a base plate 57. The main body portion 56 moves in the reciprocating manner in the Y-axis direction along the guides 55. The base plate 57 is provided below the main body portion 56 and has an upper surface on which the rectangular wire 3 is placed. An engagement piece 58 is inserted into the main body portion 56 so as to be movable vertically. The engagement piece 58 includes an abutment piece 58a, a supporting piece 58b, a pressing piece 58d, and a guide bar 58e. The abutment piece 58a comes into direct contact with an upper surface of the rectangular wire 3 placed on the base plate 57. The supporting piece 58b is provided above the abutment piece 58a. The pressing piece 58d is provided above the supporting piece 58b through a spring 58c so as to be movable vertically. The guide bar 58e prevents misalignment of a center of the supporting piece 58b and a center of the pressing piece 58d from each other. A roller 61 is supported by the pressing piece 58d. The roller 61 is provided so as to partially project from an upper surface of the main body portion 56. Coil springs 59 for pushing up the engagement piece 58 are interposed between the abutment piece 58a and the base plate 57. FIG. 2 illustrates a state in which the engagement piece 58 is pushed up by the coil springs 59 to separate the engagement piece 58 away from the rectangular wire 3 and release the rectangular wire 3 from the clamp 52. When the roller 61 is pushed down by the clamp actuation mechanism 54, the pressing piece 58d is moved down to bias the supporting piece 58b and the abutment piece 58a downward through the spring 58c. As a result, the rectangular wire 3 is compressed and held between the abutment piece 58a and the base plate 57. In this manner, the clamp 52 holds the rectangular wire 3.

As illustrated in FIG. 1, the clamp actuation mechanism 54 includes a vertically-movable plate 62, a clamp motor 64, and a spring (not shown). The vertically-movable plate 62 is provided to the vertical plate 51 so as to be movable upward and downward. The clamp motor 64 moves down the vertically-movable plate 62 by cam rollers 63. The spring biases upward the vertically-movable plate 62 so as to constantly hold the vertically-movable plate 62 in contact with the cam rollers 63. The vertically-movable plate 62 includes a rail 65 and rollers 66. The rail 65 is provided so as to extend in the Y-axis direction, and comes into engagement with the roller 61 (FIG. 2) of the clamp 52 to push down the roller 61 when the vertically-movable plate 62 is moved down. The rollers 66 are provided so as to be held in contact with the cam rollers 63. When the clamp 52 is moved forward, the clamp actuation mechanism 54 moves down the vertically-movable plate 62 through the cam rollers 63 by the clamp motor 64 to push down the roller 61 (FIG. 2) of the clamp 52 by the rail 65 so that the clamp 52 holds the rectangular wire 3. On the other hand, when the clamp 52 is moved backward, the clamp actuation mechanism 54 moves up the vertically-movable plate 62 through the cam rollers 63 by the clamp motor 64 to separate the rail 65 away from the roller 61 (FIG. 2) of the clamp 52 and release the rectangular wire 3 held by the clamp 52 from the clamp 52.

The driving mechanism 53 includes a ball screw 67 and a driving motor 68. The ball screw 67 is provided to the vertical plate 51 so as to extend in the Y-axis direction to be threadably fitted into the main body portion 56 of the clamp 52. The driving motor 68 rotationally drives the ball screw 67. When the rectangular wire 3 is to be delivered, the driving mechanism 53 moves forward the clamp 52 holding the rectangular wire 3 by a predetermined length corresponding to a size of each side of the edgewise coil 4 from an initial position toward the bending mechanism 10 by the ball screw 67. On the other hand, when a bending operation is to be performed by the bending mechanism 10, the driving mechanism 53 moves backward the clamp 52 which has released the rectangular wire 3 to the initial position at the time of actuation of the presser mechanism 70 in association with the bending operation. As described above, when the clamp 52 is actuated to move forward by the driving mechanism 53, the rectangular wire 3 is fed. On the other hand, when the clamp 52 is actuated to move backward, only the clamp 52 moves backward.

The clamp actuation mechanism 54 which moves up and down the vertically-movable plate 62 by the cam rollers 63 actuated by the clamp motor 64 has been described. However, the clamp actuation mechanism 54 described above is merely an example. Therefore, the vertically-movable plate 62 may be moved up and down by an air cylinder or the like. Further, the vertically-movable plate 62 may be moved up and down by other methods. The feed mechanism 50 may have any configuration as long as a preset length of the rectangular wire 3 can be fed from the spool 81 toward the bending mechanism 10. For example, the feed mechanism 50 may drive a pair of rollers respectively held in contact with an upper surface and a lower surface of the rectangular wire 3 by a driving motor or the like to feed the rectangular wire 3.

(Presser Mechanism 70)

The presser mechanism 70 prevents the rectangular wire 3 from being drawn by a bending force when the rectangular wire 3 is bent by the bending mechanism 10. The presser mechanism 70 includes a frame body 71, a presser plate 72, a cam 73, and a motor 74. The frame body 71 is provided to the vertical plate 51 to support the rectangular wire 3 from below. The presser plate 72 is provided inside the frame body 71 so as to be movable upward and downward. The cam 73 moves down the presser plate 72. The motor 74 rotates the cam 73.

When the rectangular wire 73 is bent at 90 degrees by the bending mechanism 10, a large tensile force acts in a winding direction of the rectangular wire 3. If the rectangular wire 3 is drawn in the winding direction by the tensile force, lengths of the respective sides of the edgewise coil 4 are varied to deform a coil shape. When the rectangular wire 3 is to be bent at 90 degrees by the bending mechanism 10, the presser mechanism 70 uses the motor 74 to move down the presser plate 72 through the cam 73. Thus, the presser mechanism 70 compresses the rectangular wire 3 between the presser plate 72 and the frame body 71 to prevent the rectangular wire 3 from being drawn in the winding direction.

(Bending Mechanism 10)

Figure 3:
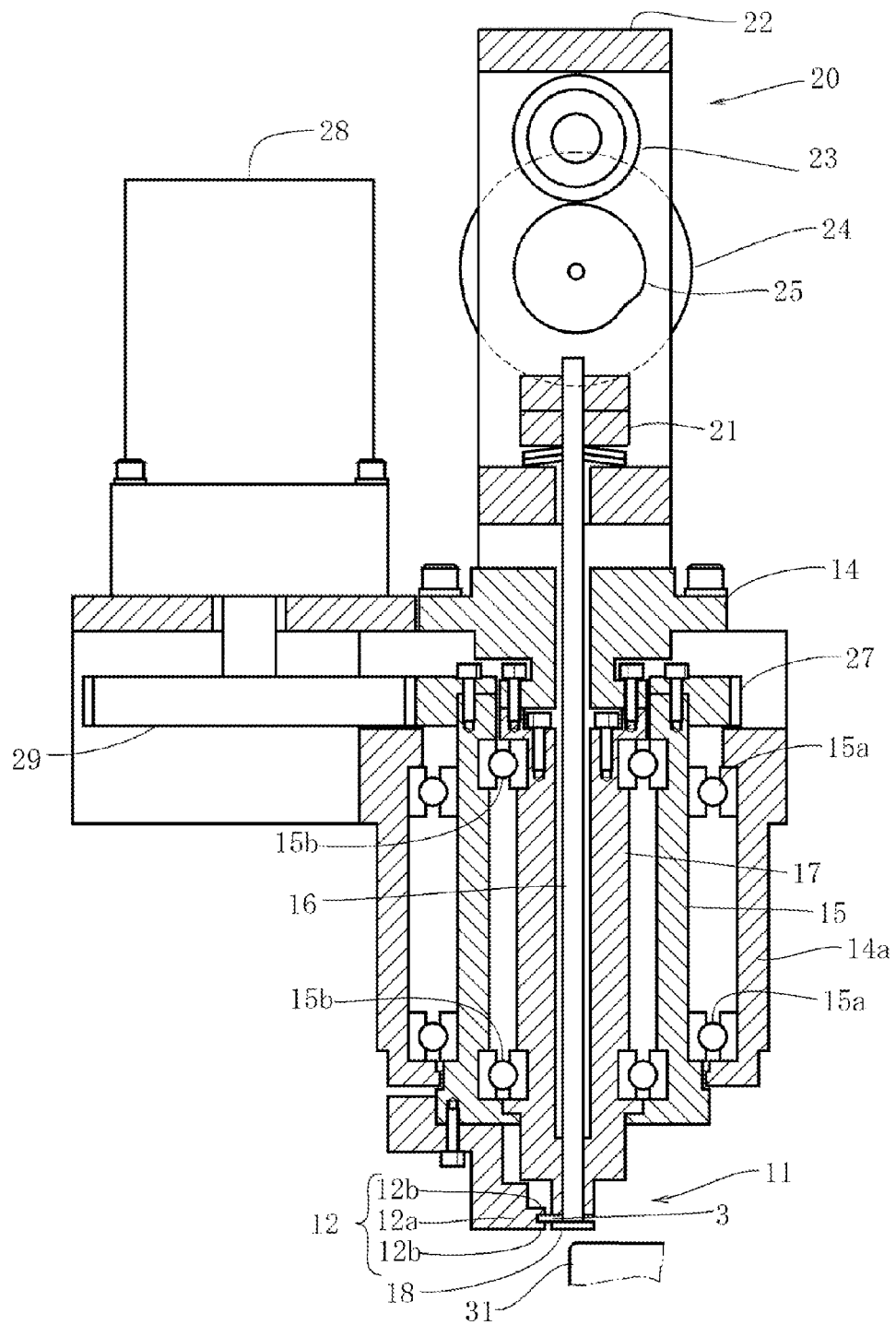
FIG. 3 is a sectional configuration view of a bending mechanism.

The bending mechanism 10 is provided to a vertical plate 13 having a lower end fixed to the side surface of the table 2. A shelf plate 14 is provided to an upper part of the vertical plate 13 at a distance away from the table 2. The main clamp 11 and the bender 12 are retained by the shelf plate 14 in a suspended manner. As illustrated in FIG. 3, the shelf plate 14 is provided with a cylindrical portion 14a projecting toward the table 2 provided below. Inside the cylindrical portion 14a, a cylindrical member 15 constituting the bender 12 is rotatably supported in a state in which axial movement of the cylindrical member 15 is restrained by two bearings 15a which are provided vertically. Inside the cylindrical member 15, a cylindrical member 17 constituting the main clamp 11 is supported in a state in which axial movement of the cylindrical member 17 is restrained by two bearings 15b which are provided vertically. In a hollow portion of the cylindrical member 17, a columnar member 16 is inserted.

Figure 4:
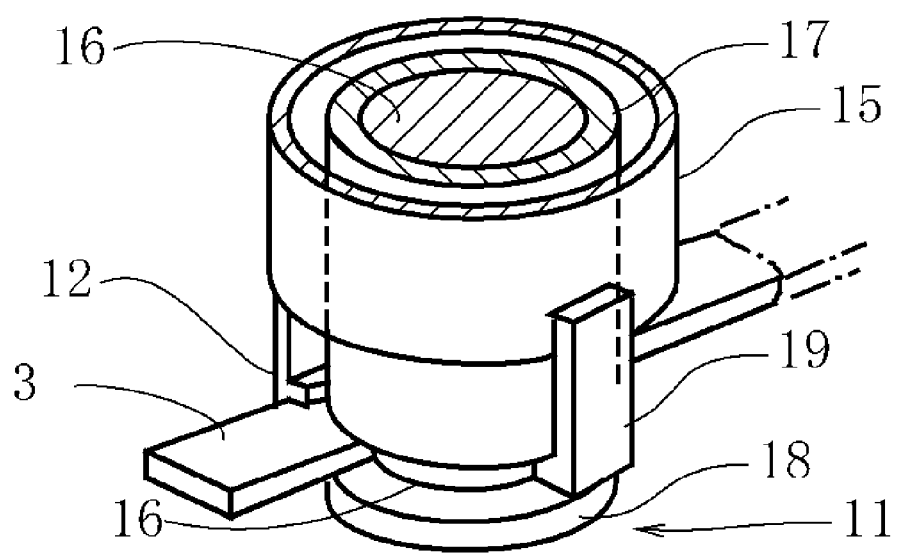
FIG. 4 is a perspective view of a main clamp.

The main clamp 11 includes the cylindrical member 17 and the columnar member 16 which is received inside the cylindrical member 17 so as to be movable axially as illustrated in FIGS. 3 and 4. A lower end of the columnar member 16 is exposed from a lower end of the cylindrical member 17. A flange 18 for supporting the rectangular wire 3 from below is formed integrally with the lower end of the columnar member 16. A clearance for fixedly holding the upper surface and the lower surface of the rectangular wire 3 therein is formed by an upper surface of the flange 18 and a lower end surface of the cylindrical member 17. The main clamp 11 receives the rectangular wire 3 in the clearance between the upper surface of the flange 18 and the lower end surface of the cylindrical member 17 and uses the columnar member 16 exposed from the cylindrical member 17 as a fulcrum member at the time of bending. A radius of the columnar member 16 is formed so as to be equal to or slightly smaller than a curvature radius of an arc formed at a corner portion of a coil guide 31 described below.

As illustrated in FIG. 3, an upper end of the columnar member 16 is connected to a frame body 22 which is movable upward and downward through a connection member 21 as connection means. A roller 23 is rotatably supported by the frame body 22. A cam 25 comes into engagement with the roller 23. The cam 25 is rotationally driven by a main-clamp motor 24 fixed to the shelf plate 14. The connection member 21 connects the columnar member 16 and the frame body 22 so as to allow the columnar member 16 and the frame body 22 to be integrally moved up and down. The rotation of the frame body 22 is blocked, and therefore the rotation of the columnar member 16 and the cylindrical member 17 is also blocked. The connection member 21, the frame body 22, the roller 23, the cam 25, and the main clamp motor 24 constitute a main-clamp actuation mechanism 20.

When the rectangular wire 3 is to be bent, the main-clamp motor 24 is rotated to move up the roller 23 by the cam 25 and move up the frame body 22. In this manner, the columnar member 16 is pulled up through the connection member 21.

As a result, the rectangular wire 3 is sandwiched between the upper surface of the flange 18 and the lower end surface of the cylindrical member 17. A position at which the flange 18 is moved up is a clamp position. When the rectangular wire 3 is to be bent, the rectangular wire 3 is vertically sandwiched to be pressed. As a result, the rectangular wire 3 can be prevented from bulging at the time of bending. A minimum size of the clearance between the upper surface of the flange 18 and the lower end surface of the cylindrical member 17 is determined by spacer plates 19 (FIG. 4) which are provided to a lower end portion of the cylindrical member 17 so as to be inserted into the clearance.

When the main-clamp motor 24 is rotated to move down the roller 23 by the cam 25, the frame body 22 is moved down and the columnar member 16 is moved down through the connection member 21. As a result, the distance between the upper surface of the flange 18 and the lower end surface of the cylindrical member 17 is increased to release the rectangular wire 3 from the main clamp 11. A position at which the flange 18 is moved down is a clamp release position.

The above-mentioned configuration of the main-clamp actuation mechanism 20 is merely an example. Therefore, the main-clamp actuation mechanism 20 may have any configuration as long as the flange 18 can be moved up and down to the clamp position and the clamp release position. For example, the columnar member 16 and the flange 18 may be moved up and down by an air cylinder or the like without using the above-mentioned cam mechanism (22 to 25). Further, the columnar member 16 and the flange 18 may be moved up and down by other methods.

The bender 12 is fixed to a lower end of the cylindrical member 15. The bender 12 includes a vertical piece 12a and a pair of projecting pieces 12b. The vertical piece 12a is held in contact with a side surface of the rectangular wire 3 on the side opposite to the side of the rectangular wire 3 held by the main clamp 11. The projecting pieces 12b respectively project from an upper end and a lower end of the vertical piece 12a on an inner surface toward the cylindrical member 17 and the flange 18. A concave portion for receiving one side surface of the rectangular wire 3 is formed between the pair of projecting pieces 12b.

On the main clamp 11 side, the upper and lower surfaces of the rectangular wire 3 are guided by the clearance between the upper surface of the flange 18 and the lower end surface of the cylindrical member 17, whereas a side surface of the rectangular wire 3 is guided by an outer circumference of the columnar member 16. On the bender 12 side, a side surface and the upper and lower surfaces of the rectangular wire 3 are guided by the vertical piece 12a and the projecting pieces 12b of the bender 12. In this manner, a receiving portion for the rectangular wire 3, which is configured to guide and bend the rectangular wire 3, is formed by the upper surface of the flange 18, the outer circumference of the columnar member 16, the lower end surface of the cylindrical member 17, and the vertical piece 12a and the projecting pieces 12b of the bender 12.

A gear 27 is fixed to an upper end of the cylindrical member 15. A gear 29 fixed to an output shaft of a bending motor 28 fixed to the shelf plate 14 is brought into meshing engagement with the gear 27. The bending motor 28 rotates the cylindrical member 15 at 90 degrees from an initial position through an intermediation of the gears 27 and 29 which are in meshing engagement with each other to bend the rectangular wire 3 held in the receiving portion at 90 degrees, and then rotates the cylindrical member 15 at 90 degrees again to return the cylindrical member 15 to the initial position.

As illustrated in FIG. 1, the winding device 1 includes the coil guide 31 and a coil-guide moving mechanism 30. The edgewise coil 4 is formed by alternately repeating the feeding of the rectangular wire 3 by the feed mechanism 50 and the bending of the rectangular wire 3 by the bending mechanism 10, and therefore is lowered under its own weight. The coil guide 31 supports the edgewise coil 4 from below. The coil-guide moving mechanism 30 is provided as coil-guide moving means for moving the coil guide 31.

(Coil Guide 31)

Figure 5:
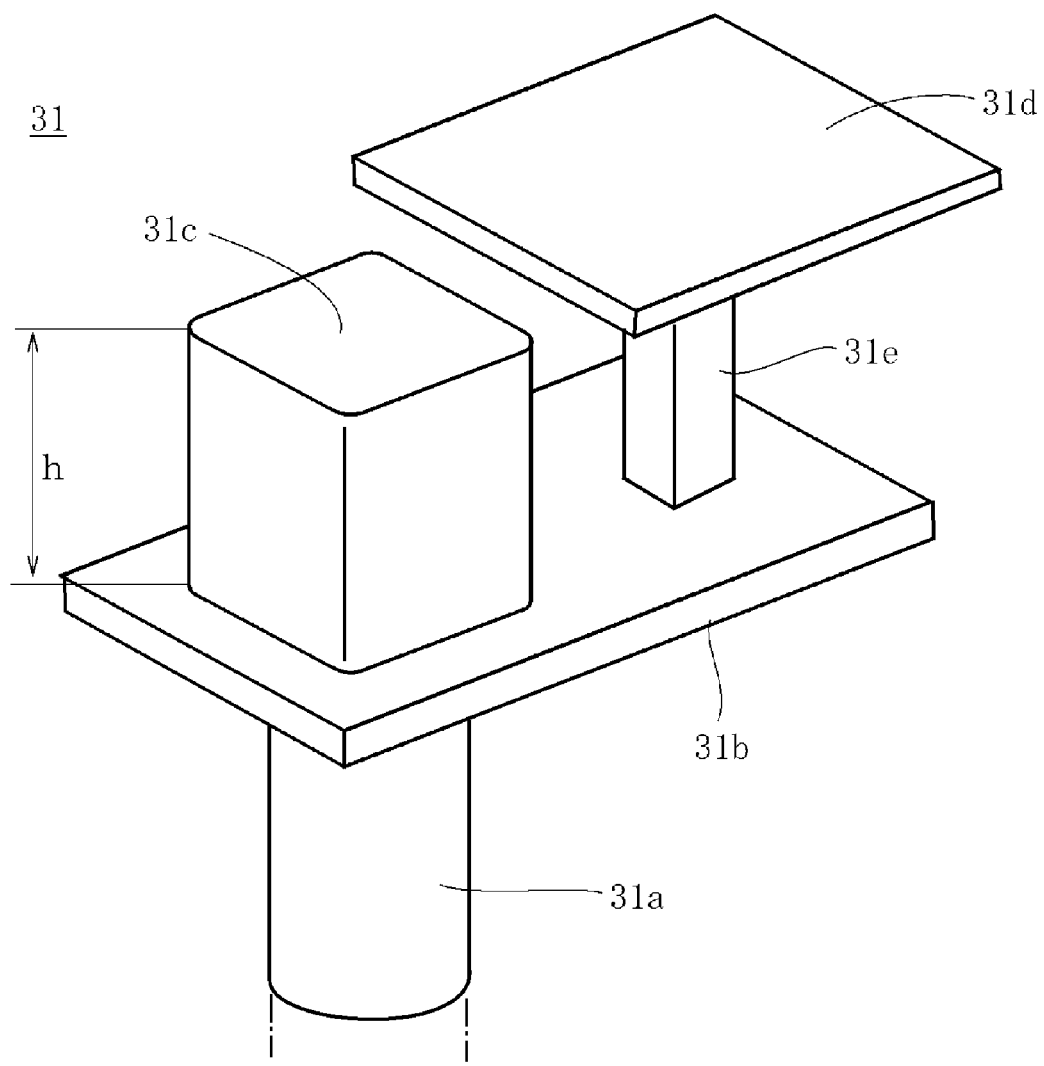
FIG. 5 is a perspective view of a coil guide.

As illustrated in FIG. 5, the coil guide 31 includes a base plate 31b, a guide column 31c, and a guide base 31d. The base plate 31b is provided horizontally to an upper end of a supporting column 31a extending in a vertical direction. The guide column 31c is provided so as to stand vertically on the base plate 31b to be brought into engagement with an inner circumferential side of the first coil portion 4a having the rectangular cylindrical shape. The guide base 31d is provided so as to stand vertically on the base plate 31b and to be separated away from the guide column 31c. The guide column 31c is formed into a prismatic shape so as to have an outer circumferential shape approximately the same as an inner circumferential shape of the first coil portion 4a (FIG. 7). Thus, each of four corner portions of the guide column 31c is formed to have an arc-like shape. The curvature radius of each of the corner portions is the same as the radius of the columnar member 16 of the bending mechanism 10. A height h of the guide column 31c is approximately equal to or slightly shorter than a length L (FIG. 7) of the first coil portion 4a which is intended to be obtained.

The guide base 31d is mounted on an upper surface of the base plate 31b through a leg member 31e so that an upper surface of the guide base 31d is located higher than the upper surface of the base plate 31b. The guide base 31d has an upper surface on which the second coil portion 4c (FIG. 7) is to be placed. A height of a position of the upper surface of the guide base 31d from the upper surface of the base plate 31b is formed to be at least equal to or slightly larger than the length of the first coil portion 4a.

(Coil-Guide Moving Mechanism 30)

As illustrated in FIG. 1, the coil-guide moving mechanism 30 follows the movement of the edgewise coil 4 by the feeding operation performed by the feed mechanism 50 to move the coil guide 31, and follows the edgewise coil 4 moving while rotating with the bending operation performed by the bending mechanism 50 to move the coil guide 31 while rotating the coil guide 31. Moreover, the coil-guide moving mechanism 30 moves up and down the coil guide 31. Thus, the coil-guide moving mechanism 30 includes a coil-guide rotating mechanism 32 (FIG. 6), a coil-guide vertically-moving mechanism 36 (FIG. 6), and an XY moving table 34. The coil-guide rotating mechanism 32 rotates the coil guide 31 about the Z axis. The coil-guide vertically-moving mechanism 36 moves up and down the coil guide 31 in the Z-axis direction. The XY moving table 34 moves the coil guide 31 in a direction within the horizontal plane. The coil-guide rotating mechanism 32 and the coil-guide vertically-moving mechanism 36 are provided to a coil-guide receiver 33. The XY moving table 34 is provided on the table 2 to support the coil-guide receiver 33, and changes a position of the coil-guide receiver 33 on the table 2.

Figure 6:
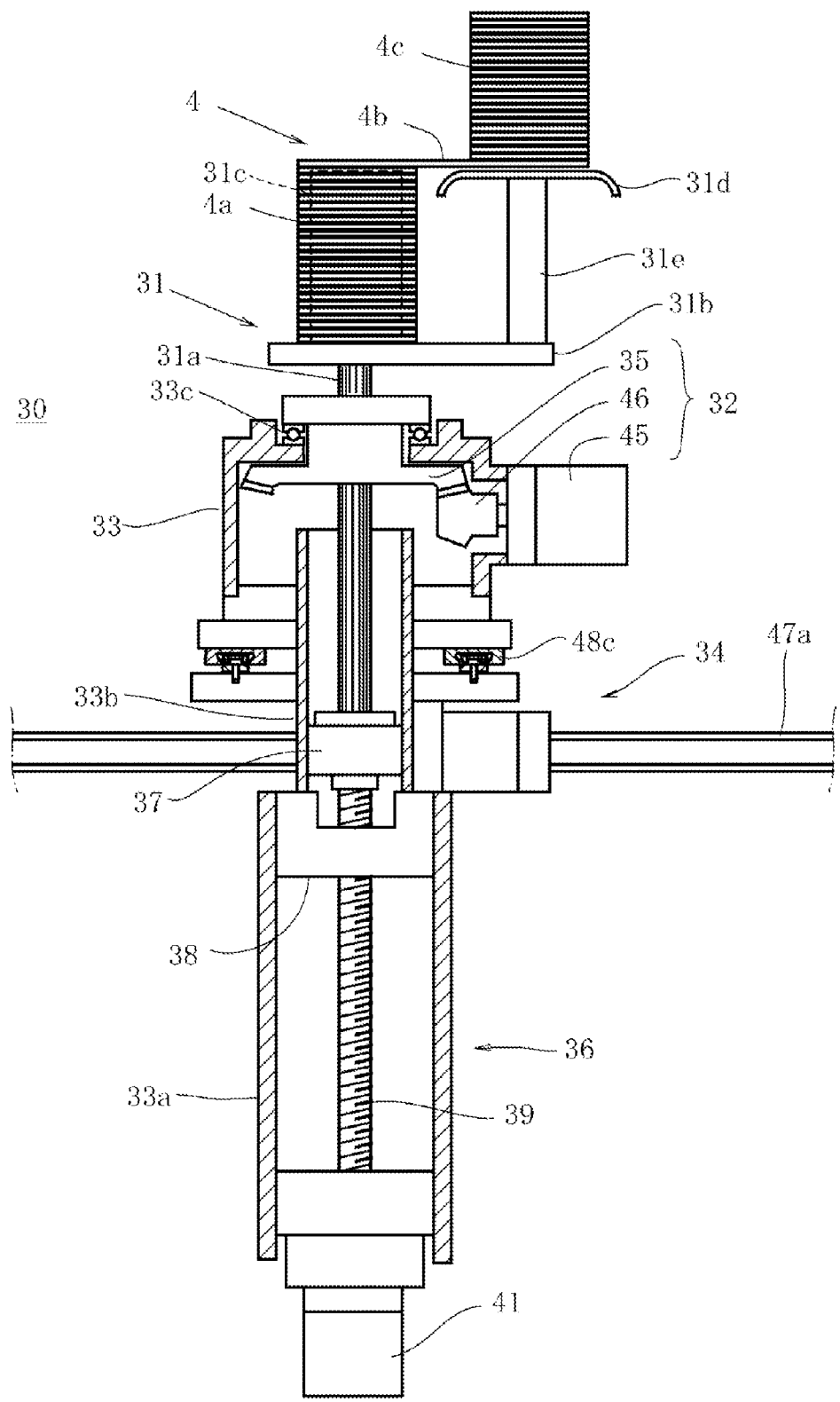
FIG. 6 is a sectional configuration view of a coil-guide moving mechanism.

As illustrated in FIG. 6, the coil-guide rotating mechanism 32 includes a large bevel gear 35. The large bevel gear 35 is provided in an upper part of the coil-guide receiver 33 and is rotatable about the Z axis by a bearing 33c. The supporting column 31a is spline-coupled to a center of the large bevel gear 35, and is provided so as to be unrotatable relative to the large bevel gear 35 and movable in the axial direction.

The supporting column 31a extends downward through an axial portion of the large bevel gear 35 to reach inside of the coil-guide receiver 33. A vertically-moving block 37 is rotatably provided to a lower end of the supporting column 31a. An upper cylinder body 33b surrounding the supporting column 31a is provided to the coil-guide receiver 33. The vertically-moving block 37 is inserted together with the supporting column 31a into the upper cylinder body 33b so as to be movable vertically. An upper end of a ball screw 39 extending in the vertical direction is connected to the vertically-moving block 37. A ball nut 38 threadably fitted over the ball screw 39 is mounted to a lower part of the upper cylinder body 33b. A lower cylinder body 33a surrounding a part of the ball screw 39, which is located below the ball nut 38, is provided to the ball nut 38. The ball screw 39 is rotated by a servomotor 41. The servomotor 41 is received inside the lower cylinder body 33a so as to be movable vertically therein. When the servomotor 41 rotationally drives the ball screw 39, the vertically-moving block 37 provided to the upper end of the ball screw 39 is moved up and down because the ball nut 38 into which the ball screw 39 is threadably fitted cannot be moved up and down. As a result, the coil guide 31 is moved up and down through the supporting column 31a supported by the vertically-moving block 37. The vertically-moving block 37, the ball nut 38, the ball screw 39, and the servomotor 41 constitute a coil-guide vertically-moving mechanism 36 for moving up and down the coil guide 31.

The coil-guide rotating mechanism 32 includes the large bevel gear 35, a coil-guide rotating motor 45, and a small bevel gear 46. The large bevel gear 35 is provided in the upper part of the coil-guide receiver 33. The coil-guide rotating motor 45 is provided on a side surface of the coil-guide receiver 33 so as to be rotatable about the Y axis (or the X axis). The small bevel gear 46 is rotated by the coil-guide rotating motor 45 so as to be brought into meshing engagement with the large bevel gear 35. Therefore, by rotating the small bevel gear 46 by the coil-guide rotating motor 45, the large bevel gear 35 is rotated about the Z axis. Then, the coil guide 31 is rotated about the Z axis through an intermediation of the supporting column 31a which rotates with the large bevel gear 35.

The XY moving table 34, which changes the position of the coil-guide receiver 33 in the plane, includes a frame body 34a, a ball screw 47a, a Y-axis motor 47b, a Y-axis table 47d, a ball screw 48a, an X-axis motor 48b, and an X-axis table 48d as illustrated in FIG. 1. The frame body 34a is fixed onto the table 2. The ball screw 47a passes through the frame body 34a to be arranged in the Y-axis direction. The Y-axis motor 47b rotationally drives the ball screw 47a. The Y-axis table 47d moves in the Y-axis direction along a Y-axis slider 47c by the rotation of the ball screw 47a. The ball screw 48a is provided above the Y-axis table 47d to be arranged in the X-axis direction. The X-axis motor 48b rotationally drives the ball screw 48a. The X-axis table 48d moves in the X-axis direction along an X-axis slider 48c by the rotation of the ball screw 48a. The coil-guide receiver 33 is fixed onto the X-axis table 48d.

The coil guide 31 is configured so as to be movable in the three axis directions and rotatable by the coil-guide rotating mechanism 32, the coil-guide vertically-moving mechanism 36, and the XY moving table 34.

Next, a winding method for the edgewise coil 4 using the winding device 1 is described.

The winding method for the edgewise coil 4 according to this embodiment includes a first coil formation step of alternately repeating the feeding of the rectangular wire 3 from the spool 81 and the bending of the rectangular wire 3 to form the first coil portion 4a having the rectangular cylindrical shape, a connecting-wire formation step of forming the connecting wire 4b from a part of the rectangular wire 3 fed from the spool 81 after the formation of the first coil portion 4a, and a second coil formation step of sequentially bending a part of the rectangular wire 3 fed from the spool 81 after the formation of the connecting wire 4b in the same direction to form the second coil portion 4c having the rectangular cylindrical shape connected to the first coil portion 4a through the connecting wire 4b. Each of the steps is described in detail below.

(First Coil Formation Step)

In the first coil formation step, the feeding of the rectangular wire 3 from the spool 81 and the bending of the rectangular wire 3 are alternately repeated to form the first coil portion 4a having the rectangular cylindrical shape (FIG. 7). A specific procedure is now described. As illustrated in FIG. 1, the rectangular wire 3 is drawn from the spool 81 to pass through the vertical straightener 85 and the horizontal straightener 83, through the region between the main body portion 56 and the base plate 57 of the feed mechanism 50, and through the frame body 71 of the presser mechanism 70 to be guided to the bending mechanism 10.

In the bending mechanism 10, as illustrated in FIG. 3, a direction of an opening of the receiving portion for the rectangular wire 3, which is formed by the upper surface of the flange 18 of the main clamp 11, the outer circumference of the columnar member 16, the lower end surface of the cylindrical member 17, and the vertical piece 12a and the projecting pieces 12b of the bender 12 is oriented in the Y-axis direction. Then, the flange 18 of the main clamp 11 is moved down to achieve the clamp release state in which the receiving portion for the rectangular wire 3 is opened. In this state, a distal end of the rectangular wire 3 is inserted into the clearance between the flange 18 and the cylindrical member 17, while the rectangular wire 3 is positioned by the bender 12 from the outer side so that the distal end of the rectangular wire 3 is received in the receiving portion.

Returning to FIG. 1, the clamp motor 64 of the feed mechanism 50 is rotated to bring convex portions of the cams 63 into abutment respectively with the rollers 66 of the vertically-movable plate 62 to move down the vertically-movable plate 62. When the vertically-movable plate 62 is moved down, the rail 65 comes into abutment with the roller 61 (FIG. 2) of the clamp 52 to move down the roller 61. As a result, the rectangular wire 3 is clamped between the engagement piece 58 and the base plate 57. Then, the ball screw 67 is rotationally driven by the driving motor 68 to move the clamp 52 including the main body portion 56 and the base plate 57 forward and feed the rectangular wire 3 by the predetermined length. As a result, as indicated by the arrow in solid line illustrated in FIG. 8, the rectangular wire 3 is fed for the first time. By the first feeding, the rectangular wire 3 projects toward the distal end side beyond the receiving portion of the bending mechanism 10.

Next, the part of the fed rectangular wire 3 is bent. For the bending, the motor 74 of the presser mechanism 70 illustrated in FIG. 1 is first actuated to move down the presser plate 72 and clamp the rectangular wire 3. At the same time, the clamp motor 64 of the feed mechanism 50 is rotated to bring the concave portions of the cams 63 into abutment with the rollers 66 of the vertically-movable plate 62 and move up the vertically-movable plate 62. When the vertically-movable plate 62 is moved up, the rail 65 is separated away from the roller 61 of the clamp 52 to cancel a pressing force on the engagement piece 58 and release the clamping of the rectangular wire 3.

Next, the ball screw 67 is rotationally driven by the driving motor 68 to move the clamp 52 backward so that the clamp 52 returns to the initial position. While the clamp 52 is moving backward, the rectangular wire 3 maintains a stopped state. In this manner, preparation for next feeding is made.

Figure 8:
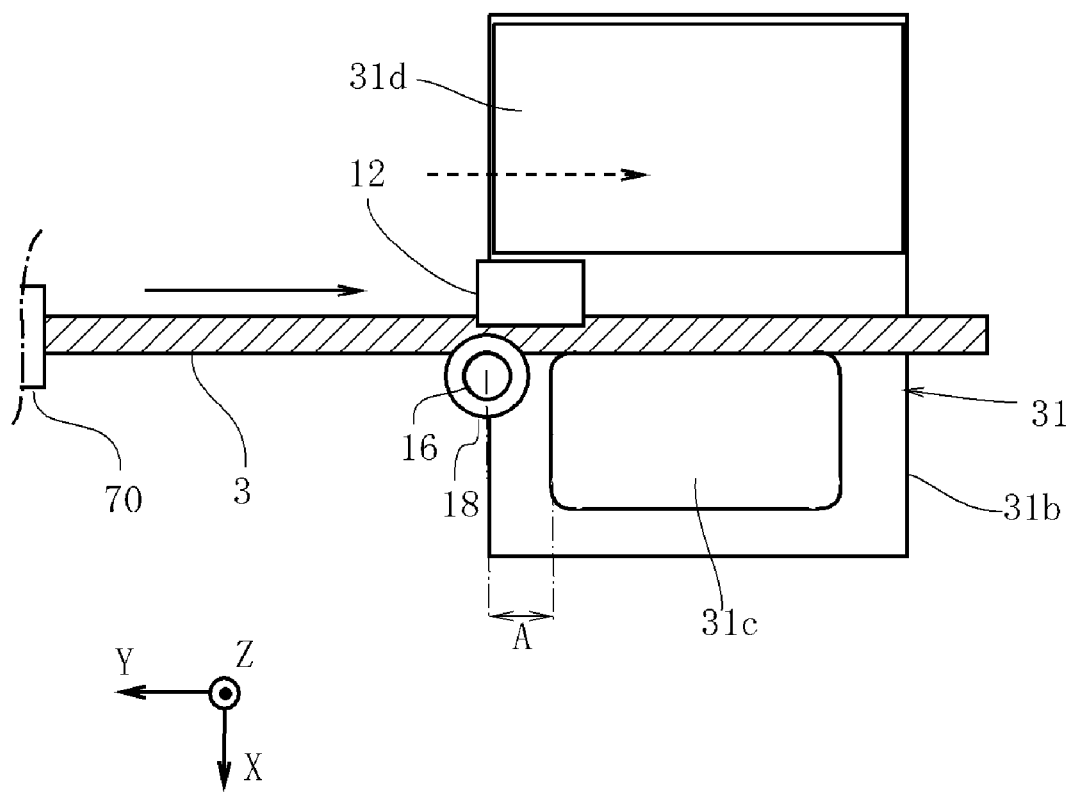
FIG. 8 is an operation diagram illustrating first feeding of a rectangular wire for formation of a first coil portion.

In the first coil formation step, the sequentially formed first coil portion 4a is supported by the guide column 31c which comes into engagement with an inner circumference of the first coil portion 4a so as to move with the first coil portion 4a. For the bending of the rectangular wire 3, the coil guide 31 is moved by the XY moving table 34, and is also rotated by the coil-guide rotating mechanism 32. In this manner, as illustrated in FIG. 8, the guide column 31c is located so that a side surface thereof comes into contact with the rectangular wire 3 projecting from the receiving portion within the XY plane (the rectangular wire 3 and the guide column 31c are separated away from each other in the Z-axis direction). Moreover, the guide column 31c is located so that the corner portion is separated away from the columnar member 16 by a predetermined distance A in the Y-axis direction. The predetermined distance A is determined based on a length size of the rectangular wire 3 (central portion of the rectangular wire 3) wound around the columnar member 16 (the arc-like corner portion of the coil guide 31). Therefore, the length size is set in accordance with a winding length over the surface of the columnar member 16 and a width size of the rectangular wire 3.

Figure 9:
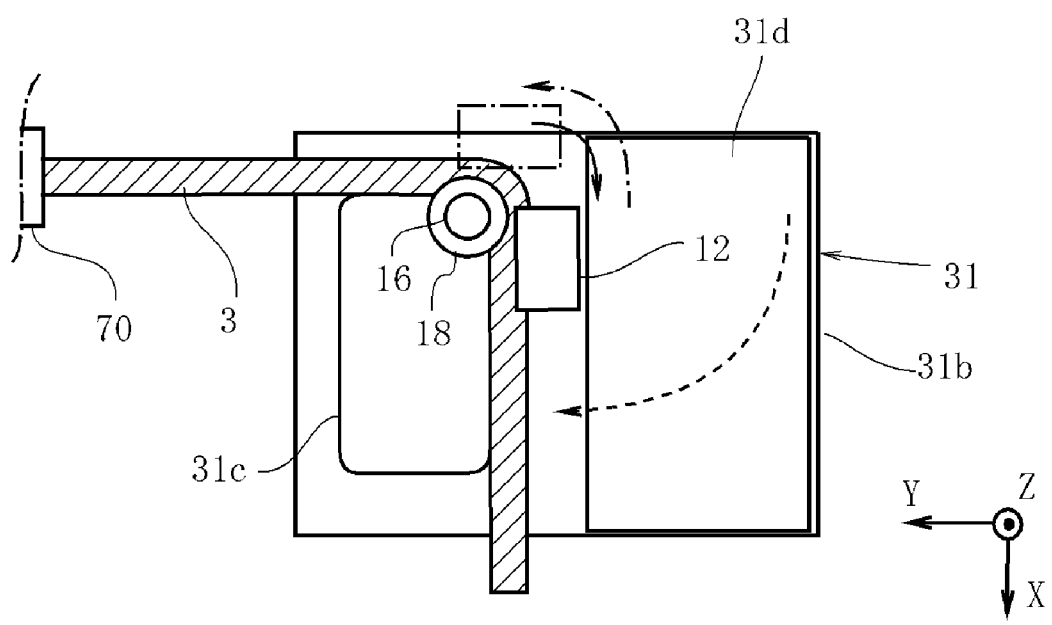
FIG. 9 is an operation diagram illustrating bending of the rectangular wire.

In this state, the flange 18 of the main clamp 11 of the bending mechanism 10 is moved up to vertically narrow the receiving portion for the rectangular wire 3 and achieve the clamp state (FIG. 3). Then, as indicated by the arrow in solid line illustrated in FIG. 9, the bending motor 28 is rotated to rotate the cylindrical member 15 at 90 degrees and rotate the bender 12 about the columnar member 16 (main clamp 11 whose rotation is blocked) at 90 degrees, thereby bending the rectangular wire 3 at 90 degrees.

In synchronization with the above-mentioned operation, the coil guide 31 is similarly rotated about the Z axis by the coil-guide rotating motor 45, while the center of the coil guide 31 is moved by the XY moving table 34 in the X and Y-axis directions with a trajectory (involute curve) on which the rectangular wire 3 is wound around the columnar member 16 at only 90 degrees. As described above, the coil guide 31 is moved while being rotated as indicated by the arrow in broken line illustrated in FIG. 9 so that the rectangular wire 3 to be bent along the side surface of the guide column 31c in the direction within the XY plane is moved so as to substantially keep the abutment state as viewed from above the XY plane.

When the rectangular wire 3 is bent at 90 degrees, a tension to draw the rectangular wire 3 is applied to the rectangular wire 3 by a friction force between the bender 12 and the rectangular wire 3. However, the rectangular wire 3 is held by the presser mechanism 70. Therefore, the rectangular wire 3 is not drawn when the rectangular wire 3 is bent, and hence the coil shape does not become unstable. Moreover, when the rectangular wire 3 is bent at 90 degrees, the rectangular wire 3 contracts on the inner circumferential side of the bending. Therefore, without a large pressure thereon, the rectangular wire 3 bulges. The main-clamp actuation mechanism 20 is driven to move the main clamp 11 to the clamp position so that the pressing force is vertically applied to the rectangular wire 3 to prevent the rectangular wire 3 from bulging to be larger than a predetermined size.

Next, the main-clamp actuation mechanism 20 is actuated to move down the flange 18 of the main clamp 11 to vertically enlarge the receiving portion for the rectangular wire 3 so as to achieve the clamp release state. Then, as indicated by the arrow in alternate long and short dash line illustrated in FIG. 9, the cylindrical member 15 is reversely rotated at 90 degrees by the bending motor 28 to rotate the bender 12 about the columnar member 16 at 90 degrees and return the bender 12 to the original position. In this manner, the bending of the rectangular wire 3 is completed.

Next, subsequent feeding of the rectangular 3 to form the first coil portion 4a is performed. As illustrated in FIG. 1, the motor 74 of the presser mechanism 70 is actuated to move up the presser plate 72 and release the clamping for the rectangular wire 3. Then, the clamp motor 64 of the feed mechanism 50 is rotated to bring the convex portions of the cams 63 into abutment with the rollers 66 and move down the vertically-movable plate 62. Then, the rail 65 is brought into abutment with the roller 61 to move down the roller 61 and fixedly clamp the rectangular wire 3 between the engagement piece 58 and the base plate 57. Then, the ball screw 67 is rotationally driven by the driving motor 68 to move the clamp 52 forward and feed the rectangular wire 3 by the predetermined length. Then, the motor 74 of the presser mechanism 70 is actuated to move down the presser plate 72 and clamp the rectangular wire 3. As described above, the feed mechanism 50 is returned to the initial state under a state in which the rectangular wire 3 is released.

Figure 10:
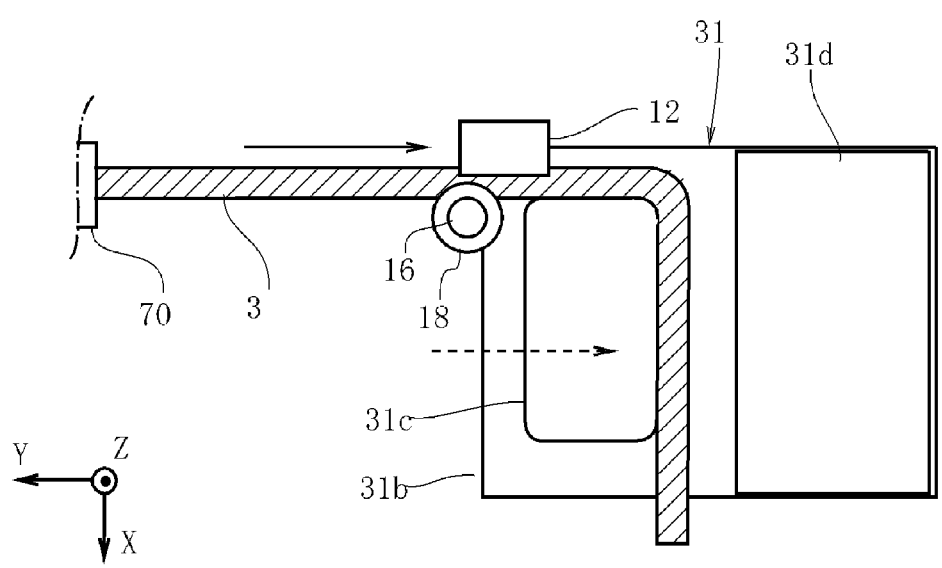
FIG. 10 is an operation diagram illustrating feeding of the rectangular wire, which is subsequent to FIG. 9.

The fed rectangular wire 3 projects toward the distal end side beyond the receiving portion by the predetermined length as indicated by the arrow in solid line as illustrated in FIG. 10. The predetermined length is equal to the sum of a length of a straight portion of the first coil portion 4a of the edgewise coil 4 and a coil length (the above-mentioned predetermined distance A to be wound around the columnar member 16) at the time of bending at 90 degrees. In synchronization with the feeding of the rectangular wire 3, the coil guide 31 also moves in the Y-axis direction as indicated by the arrow in broken line so as to keep a state in which the guide column 31c is substantially held in contact with the side surface of the rectangular wire 3.

Figure 11:
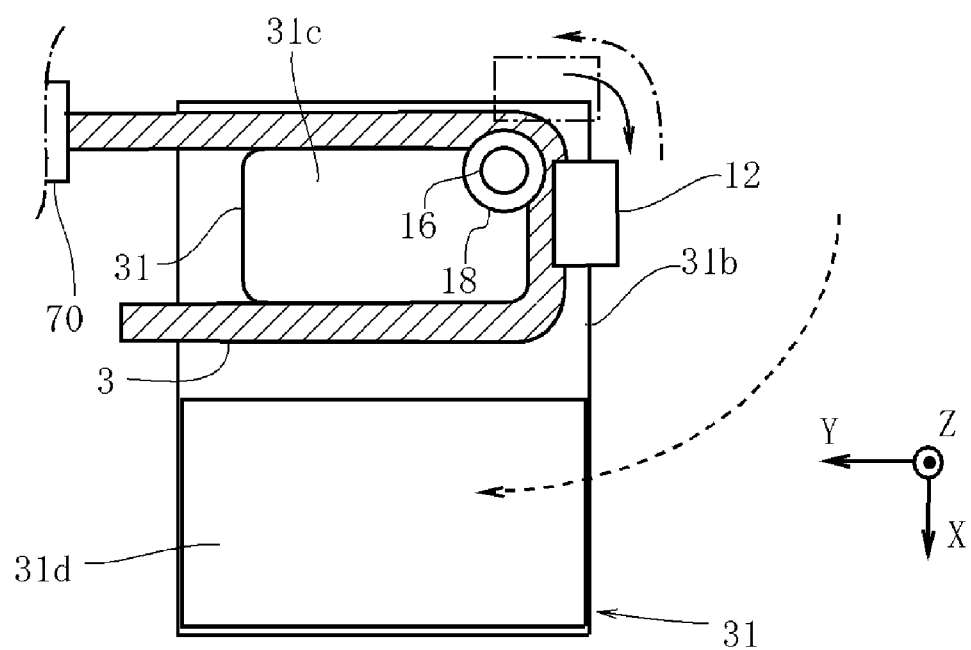
FIG. 11 is an operation diagram illustrating bending of the rectangular wire, which is subsequent to FIG. 10.

Next, the rectangular wire 3 is bent again. The newly fed rectangular wire 3 is vertically compressed by bringing the main clamp 11 into the clamp state by the main-clamp actuation mechanism 20 to rotate the bender 12 about the columnar member 16 as indicated by the arrow in solid line and bend the rectangular wire 3 as illustrated in FIG. 11. With the bending, the coil-guide moving mechanism 30 rotates the coil guide 31 about the Z axis and moves the coil guide 31 in the X-axis and Y-axis directions. The coil guide 31 is moved while being rotated as indicated by the arrow in broken line illustrated in FIG. 11 so as to keep a state in which the rectangular wire 3 is substantially held in abutment with the side surface of the guide column 31c within the XY plane.

Next, the main-clamp actuation mechanism 20 is actuated to move down the flange 18 of the main clamp 11 to vertically enlarge the receiving portion for the rectangular wire 3 and achieve the clamp release state. The cylindrical member 15 is reversely rotated by the bending motor 28 at 90 degrees as indicated by the arrow in alternate long and short dash line illustrated in FIG. 11 to rotate the bender 12 about the columnar member 16 at 90 degrees and return the bender 12 to the original position. In this manner, the second bending operation is terminated.

Subsequently, the feeding of the rectangular wire 3 and the bending of the part of the fed rectangular wire 3 are alternately repeated. In this embodiment in which the first coil portion 4a having a square shape, each of the feeding and the bending of the rectangular wire 3 is required to be repeated four times. In the process from FIG. 8 to FIG. 11, each of the feeding and the bending of the rectangular wire 3 is repeated twice. As a result, long side and short side of the first coil portion 4a are formed as illustrated in FIG. 11. Therefore, in order to obtain the first coil portion 4a having a square shape, the feeding and bending of the rectangular wire 3 are required to be repeated another two times after the state illustrated in FIG. 11.

Figure 12:
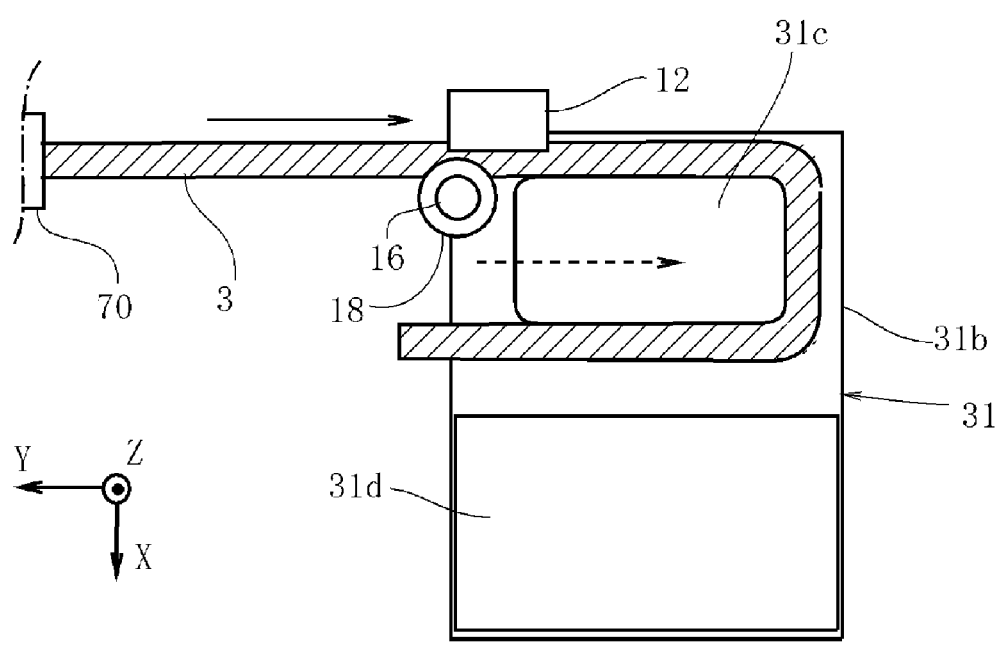
FIG. 12 is an operation diagram illustrating feeding of the rectangular wire, which is subsequent to FIG. 11.
Figure 13:
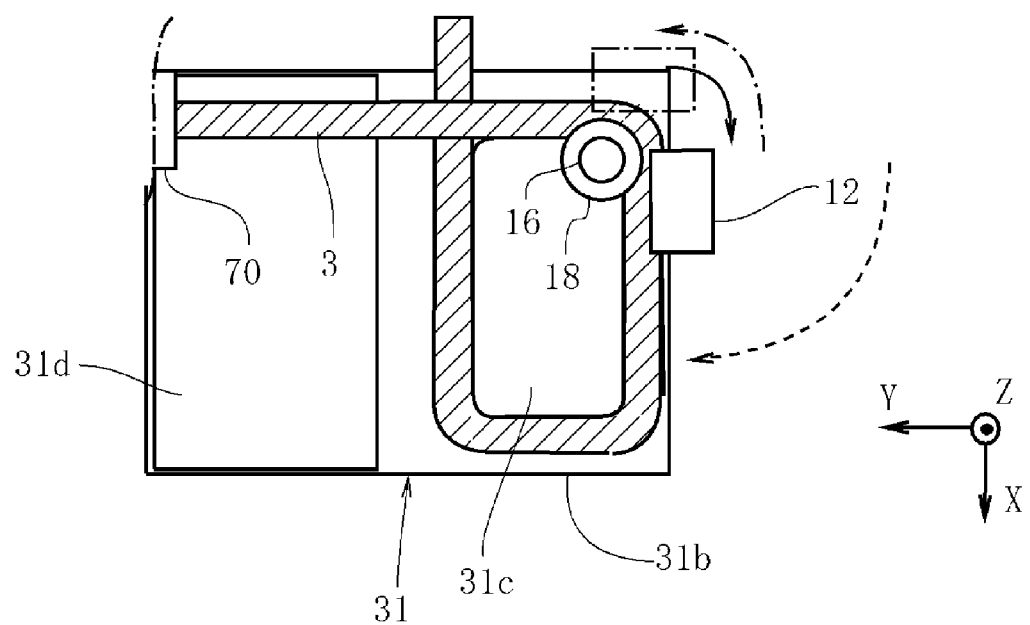
FIG. 13 is an operation diagram illustrating bending of the rectangular wire, which is subsequent to FIG. 12.
Figure 14:
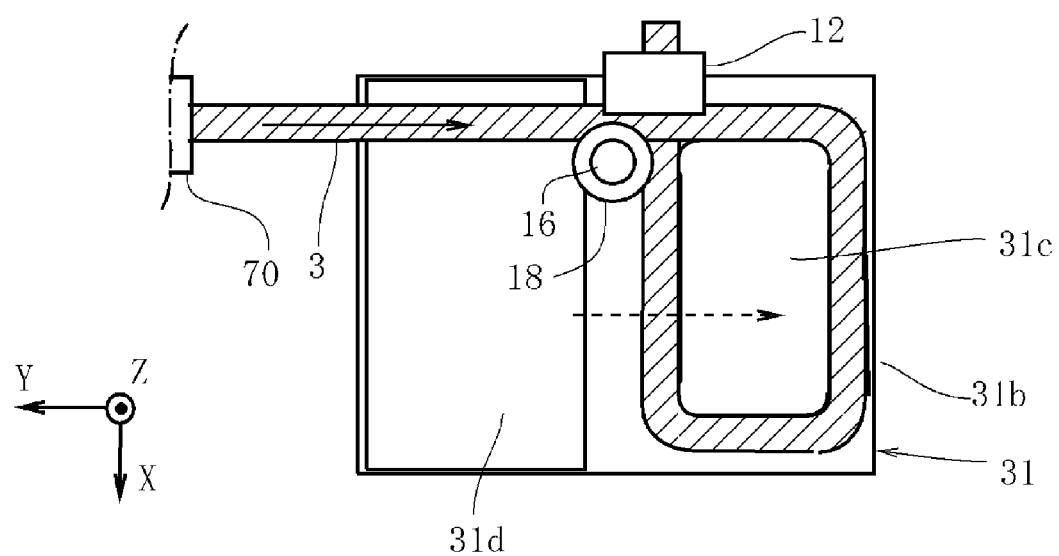
FIG. 14 is an operation diagram illustrating feeding of the rectangular wire, which is subsequent to FIG. 13.
Figure 15:
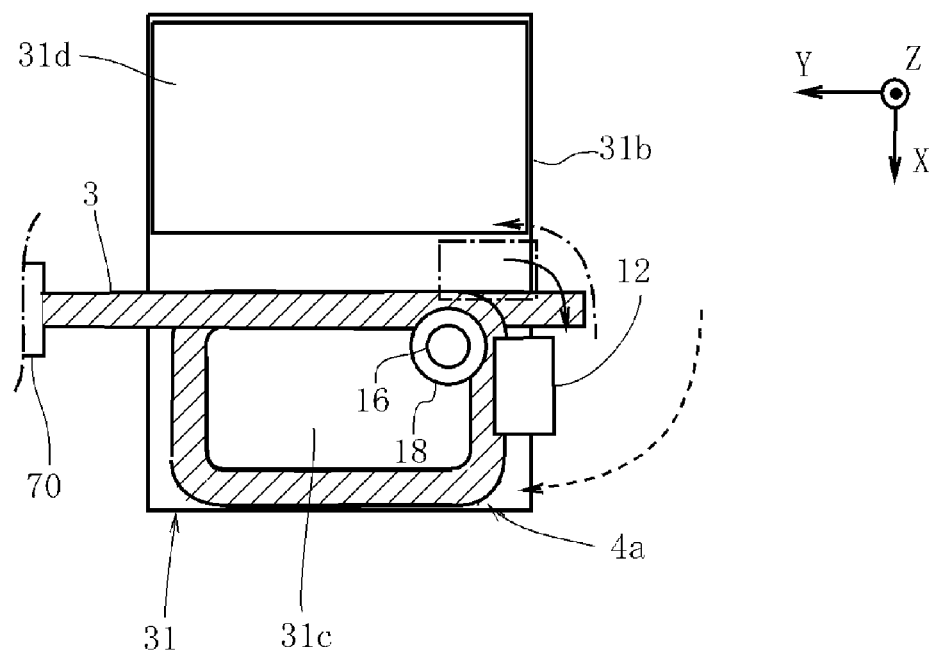
FIG. 15 is an operation diagram illustrating bending of the rectangular wire, which is subsequent to FIG. 14.

Specifically, after the long side and short side of the first coil portion 4a are formed as illustrated in FIG. 11, the feeding of the rectangular wire 3 to form another long side of the first coil portion 4a is further performed as illustrated in FIG. 12. Thereafter, the part of the fed rectangular wire 3 is bent as illustrated in FIG. 13. As a result, the long side of the first coil portion 4a is formed. Thereafter, as illustrated in FIG. 14, the feeding of the rectangular wire 3 to form another short side of the first coil portion 4a is further performed. Then, as illustrated in FIG. 15, the bending is further performed. By repeating the feeding and bending four times, the first coil portion 4a formed by one turn of the rectangular wire 3 is formed.

Figure 16:
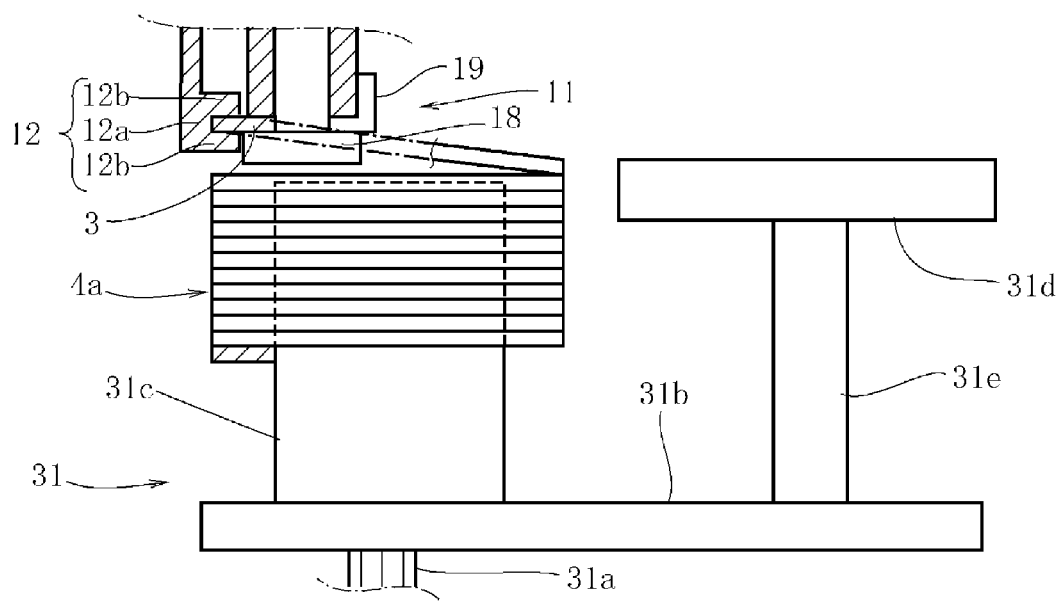
FIG. 16 is a diagram illustrating a state in which the first coil portion formed around a guide column is lowered along the guide column.

By further alternately repeating the feeding and bending of the rectangular wire 3, the first coil portion 4a made of the rectangular wire 3 wound a plurality of times is sequentially formed. As illustrated in FIG. 16, the sequentially formed first coil portion 4a is lowered under its own weight to move down around the guide column 31c of the coil guide 31 moving with the feeding and bending of the rectangular wire 3 so that the inner circumference is supported by the guide column 31c. The guide column 31c moves following the movement and rotation of the first coil portion 4a to restrain oscillation of the first coil portion 4a. Even when the rectangular wire 3 is wound at a high speed, the first coil portion 4a obtained by winding is prevented from being moved in the axial direction (vertical direction) and the radial direction (outer circumferential direction) to excessively oscillate. At a time at which the first coil portion 4a having the rectangular cylindrical shape, which is formed of a predetermined number of turns of the rectangular wire 3, is obtained, the first coil formation step is terminated.

(Connecting-Wire Formation Step)

Figure 17:
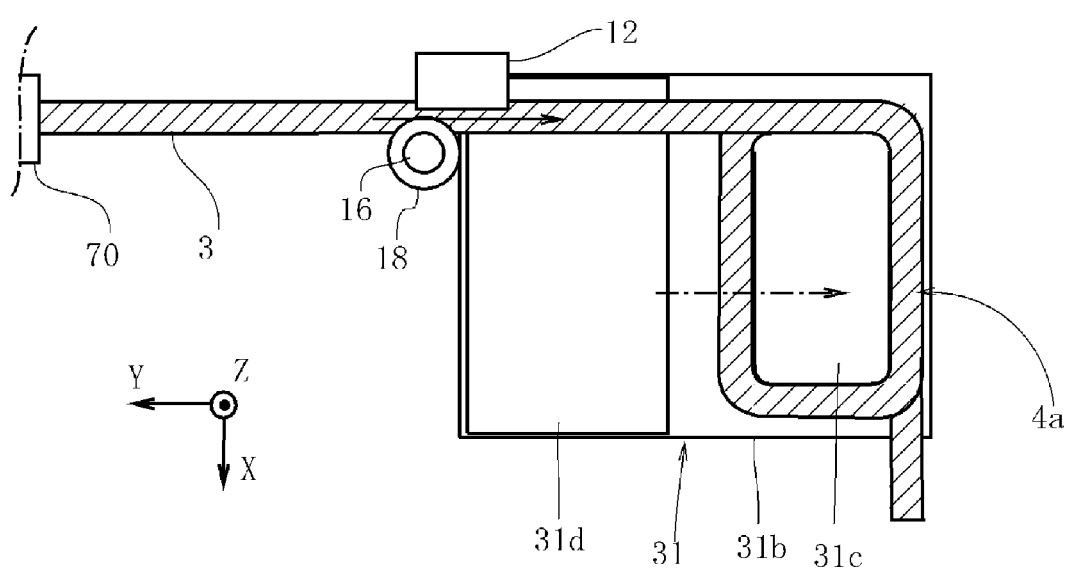
FIG. 17 is an operation diagram illustrating a state in which the rectangular wire is fed to form a connecting wire.

In the connecting-wire formation step, after the formation of the first coil portion 4a, the rectangular wire 3 is fed again from the spool 81 to form the connecting wire 4b. The feeding of the rectangular wire 3 is the same as the feeding of the rectangular wire 3 in the first coil formation step. Specifically, as illustrated in FIG. 1, the clamp motor 64 is rotated to fixedly clamp the rectangular wire 3 between the engagement piece 58 and the base plate 57. Then, the ball screw 67 is rotationally driven by the driving motor 68 to move the clamp 52 forward and feed the rectangular wire 3 by the predetermined length as indicated by the arrow in solid line illustrated in FIG. 17. The part of the fed rectangular wire 3 has a length equal to a required length of the connecting wire 4b. In synchronization with the feed of the rectangular wire 3, the coil guide 31 also moves as indicated by the arrow in alternate long and short dash line. With the thus fed rectangular wire 3, the first coil portion 4a supported by the guide column 31c also moves in the same direction. Then, for the subsequent second coil formation step, the guide base 31d of the coil guide 31 is located at a position below the columnar member 16, which corresponds to a new bending position.

(Second Coil Formation Step)

Figure 18:
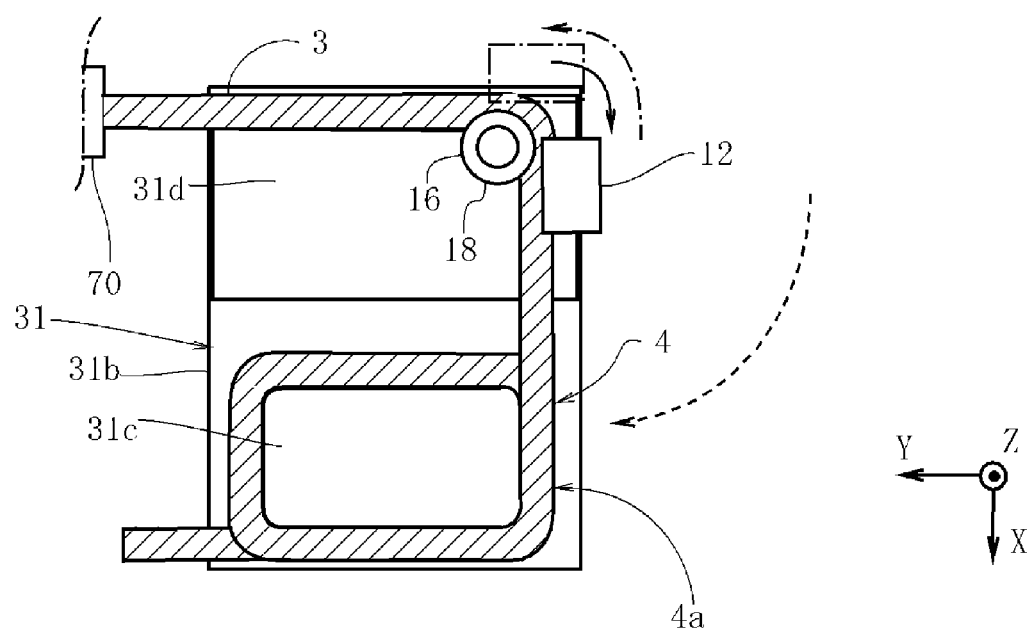
FIG. 18 is an operation diagram illustrating first bending of the rectangular wire for formation of a second coil portion.
Figure 19:
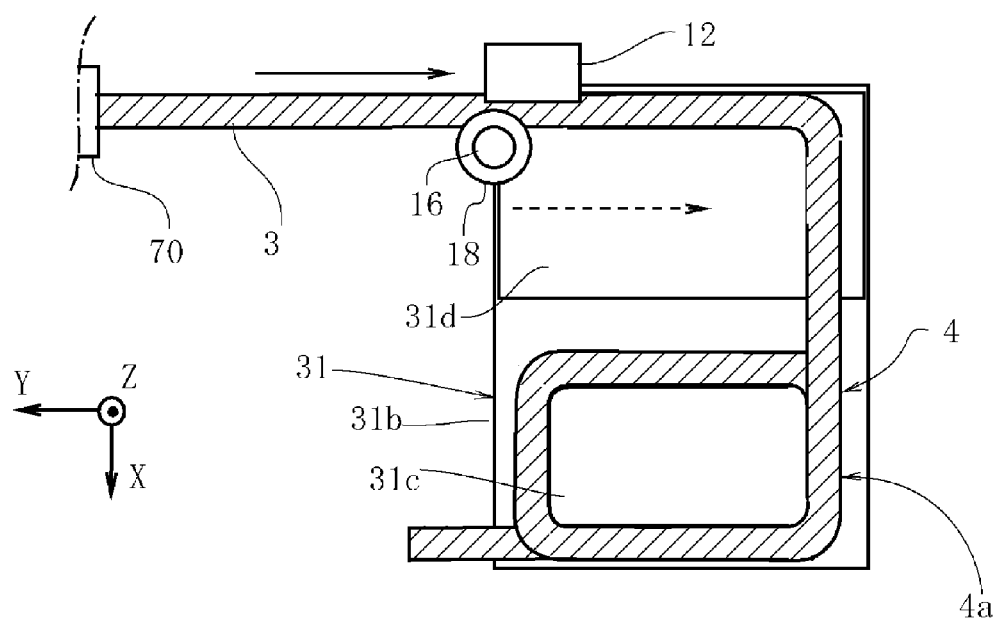
FIG. 19 is an operation diagram illustrating feeding of the rectangular wire, which is subsequent to FIG. 18.
Figure 20:
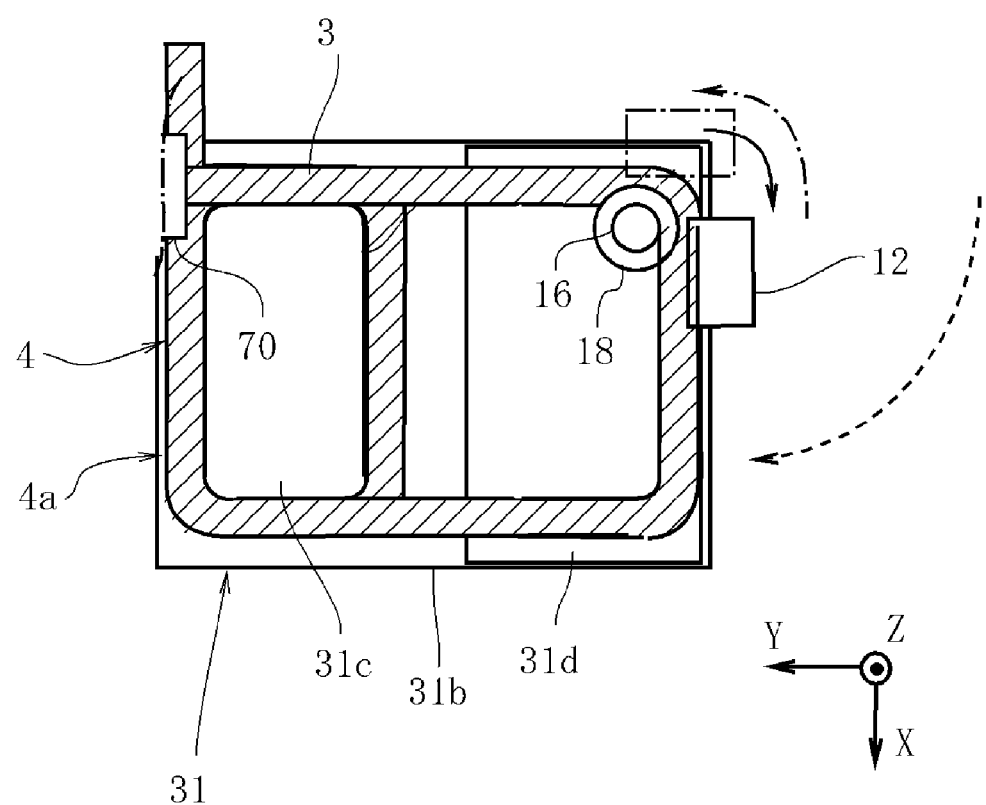
FIG. 20 is an operation diagram illustrating bending of the rectangular wire, which is subsequent to FIG. 19.
Figure 21:
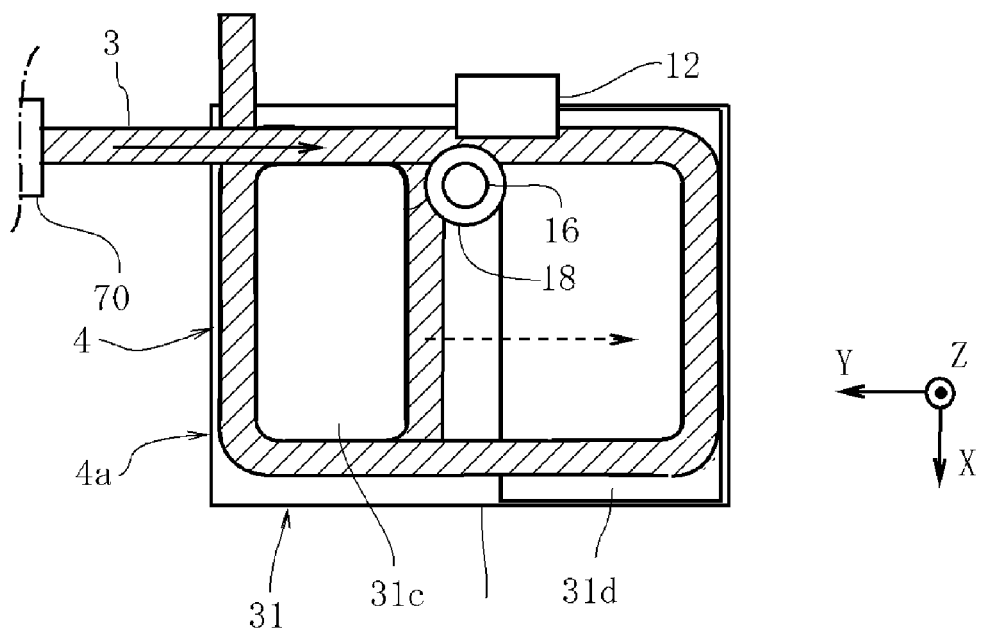
FIG. 21 is an operation diagram illustrating feeding of the rectangular wire, which is subsequent to FIG. 20.
Figure 22:
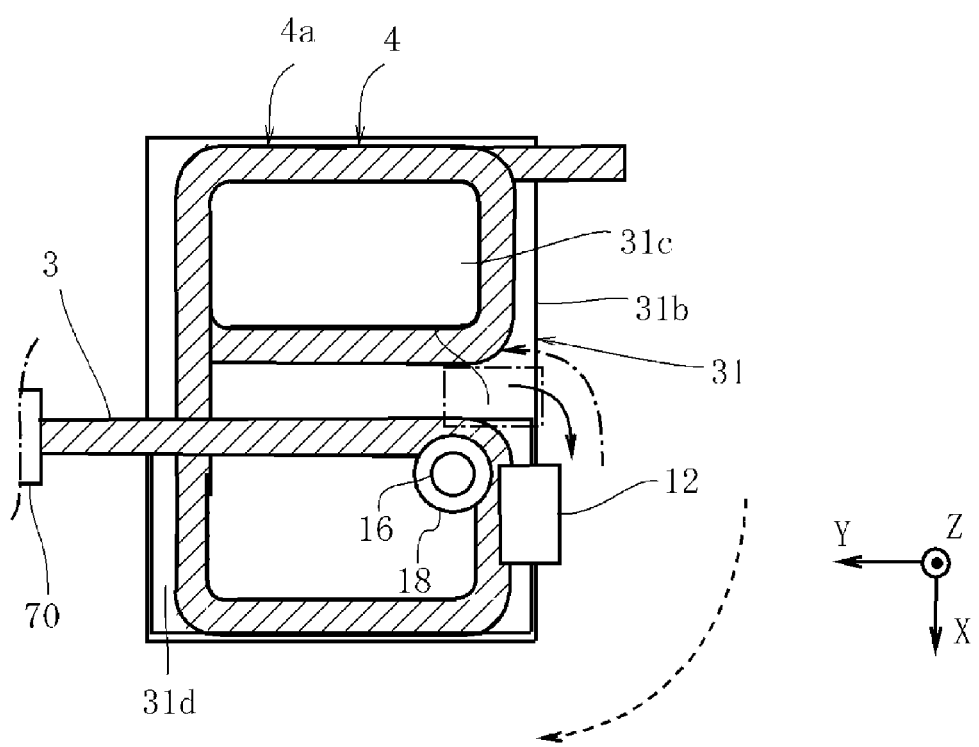
FIG. 22 is an operation diagram illustrating bending of the rectangular wire, which is subsequent to FIG. 21.
Figure 23:
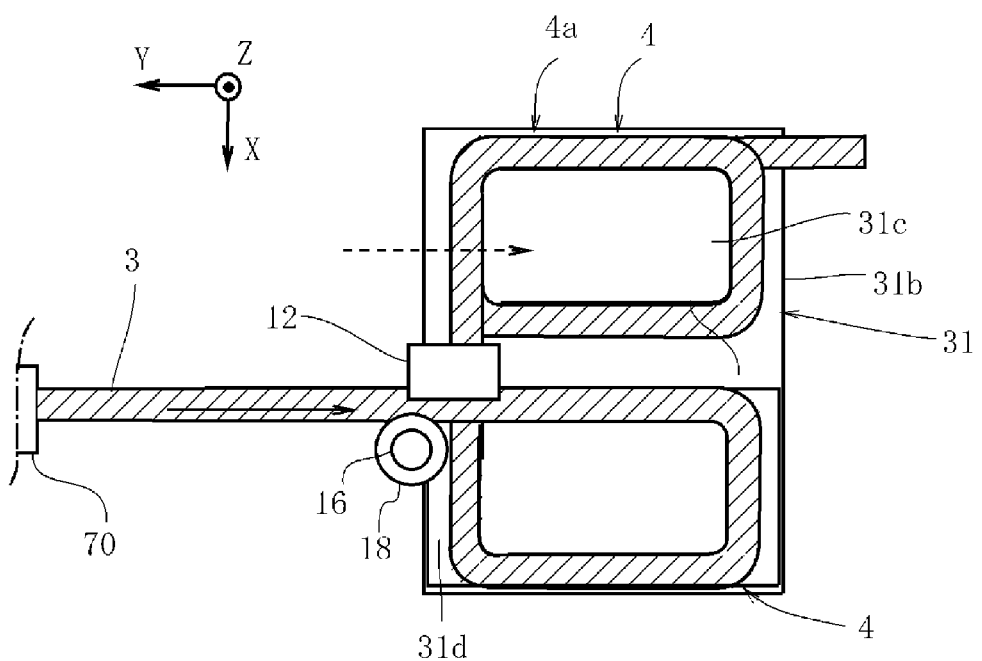
FIG. 23 is an operation diagram illustrating feeding of the rectangular wire, which is subsequent to FIG. 22.
Figure 24:
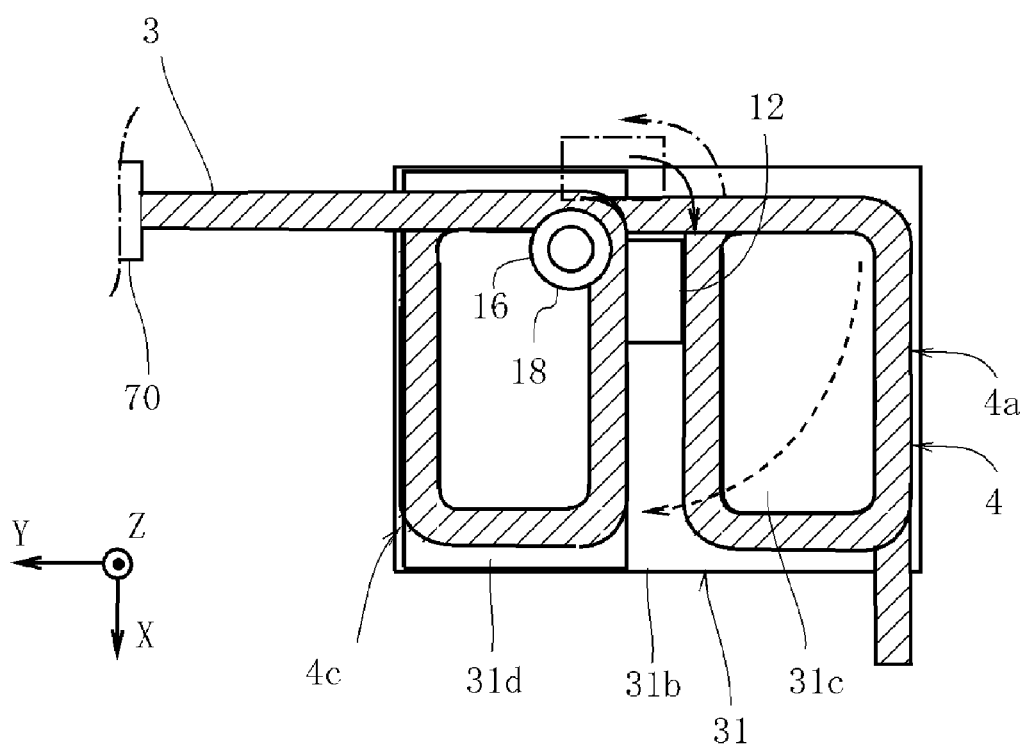
FIG. 24 is an operation diagram illustrating bending of the rectangular wire, which is subsequent to FIG. 23.

In the second coil formation step, after the formation of the connecting wire 4b, the rectangular wire 3 fed from the spool 81 is sequentially bent in the same direction to form the second coil portion 4c having the rectangular cylindrical shape, which is connected to the first coil portion 4a through the connecting wire 4b. The feeding and bending operation of the rectangular wire 3 is the same as that of the rectangular wire 3 in the first coil formation step. As illustrated in FIG. 18, a first short side of the second coil portion 4c is formed by first bending of the rectangular wire 3. By subsequent feeding of the rectangular wire 3 illustrated in FIG. 19 and bending of the rectangular wire 3 illustrated in FIG. 20, a first long side of the second coil portion 4c is formed. Further, a second short side of the second coil portion 4c is formed by feeding of the rectangular wire 3 illustrated in FIG. 21 and bending of the rectangular wire 3 illustrated in FIG. 22. A second long side of the second coil portion 4c is formed by feeding of the rectangular wire 3 illustrated in FIG. 23 and bending of the rectangular wire 3 illustrated in FIG. 24. When the feeding and bending of the rectangular wire 3 is repeated four times as described above, the second coil portion 4c formed by one turn of the rectangular wire 3 is formed. By further repeating the feeding and bending of the rectangular wire 3, the second coil portion 4c having the rectangular cylindrical shape, which is connected to the first coil portion 4a through the connecting wire 4b, is sequentially formed.

In the second coil formation step, the sequentially formed second coil portion 4c is placed on the guide base 31d which is provided adjacent to the guide column 31c and moves together with the guide column 31c so that the guide base 31d moves together with the second coil portion 4c. The second coil portion 4c obtained by repeating the feeding and bending of the rectangular wire 3 is lowered under its own weight to be placed on the guide base 31d. The guide base 31d moves following the movement and rotation of the second coil portion 4c as indicated by the arrows in broken lines illustrated in FIGS. 18 to 24. As a result, together with the first coil portion 4a supported by the guide column 31c, the second coil portion 4c is restrained from oscillating.

Figure 25:
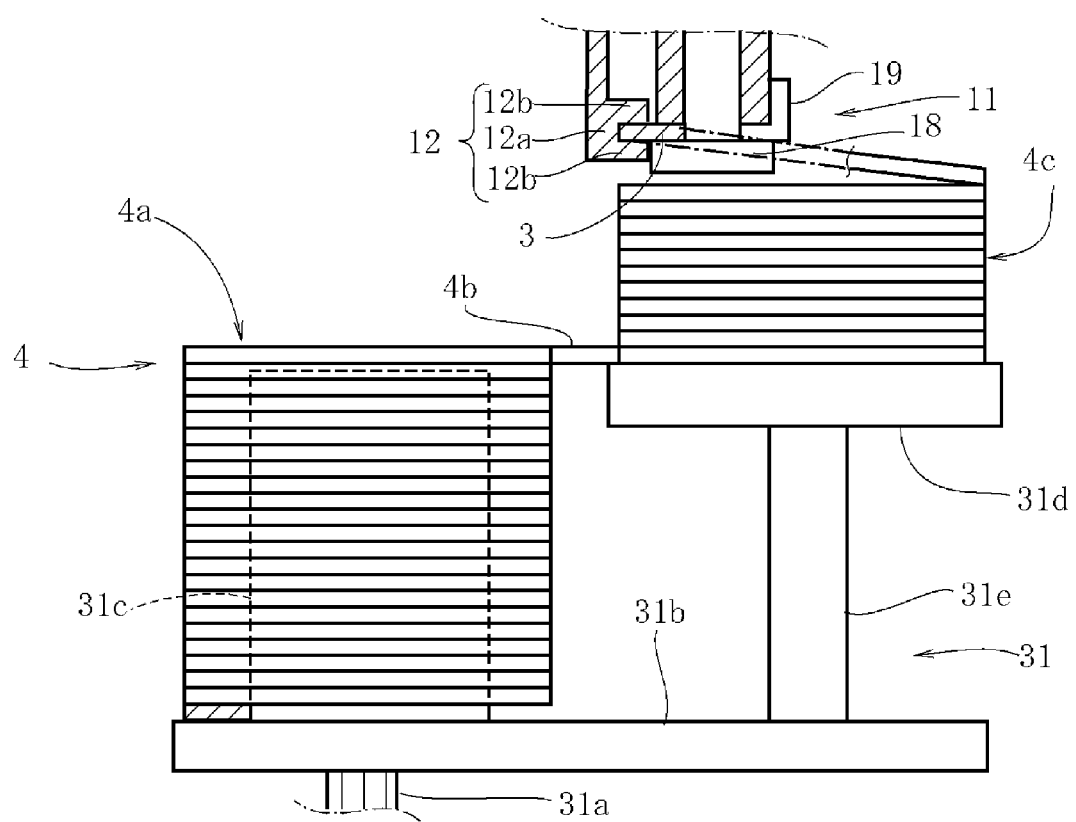
FIG. 25 is a diagram illustrating a state in which the formed second coil portion is supported on a guide base.

As illustrated in FIG. 25, in the second coil formation step, the second coil portion 4c sequentially formed by repeating the feeding and bending of the rectangular wire 3 extends downward to be extended in the axial direction. Therefore, the guide base 31d, on which the second coil portion 4c is placed, is sequentially moved down in accordance with the formation of the second coil portion 4c. As illustrated in FIG. 6, the guide base 31d is moved down by driving the servomotor 41 to rotate the ball screw 39 so as to move down the vertically-moving block 37 provided with the ball screw 39 and move down the coil guide 31 through the supporting column 31a supported by the vertically-moving block 37. It is preferred to move down the guide base 31d by the amount equal to a thickness of the rectangular wire 3 each time one turn is formed by bending the rectangular wire 3 four times. In this manner, even when the rectangular wire 3 is wound at a high speed, the wound second coil portion 4c as well as the first coil portion 4a is prevented from moving in the axial direction (vertical direction) and the radial direction (outer circumferential direction) with respect to the coil guide 31 to excessively oscillate. Then, at a time at which the second coil portion 4c having the rectangular cylindrical shape formed by a predetermined number of turns of the rectangular wire 3 is obtained, the second coil formation step is terminated.

With the winding method according to this embodiment, the sequentially formed first coil portion 4a is supported by the guide column 31c moving together with the first coil portion 4a, and the second coil portion 4c connected to the first coil portion 4a through the connecting wire 4b is placed on the guide base 31d. Therefore, as illustrated in FIG. 7, the edgewise coil 4 obtained by the winding method according to this embodiment includes the first coil portion 4a having the rectangular cylindrical shape and the second coil portion 4c having the rectangular cylindrical shape connected to the first coil portion 4a through the connecting wire 4b, and has a stepwise shape with the position of the center axis of the first coil portion 4a and that of the center axis of the second coil portion 4c being shifted from each other. Therefore, according to this embodiment, even with the single feed mechanism 50 and bending mechanism 10, the edgewise coil 4, in which the first coil portion 4a and the second coil portion 4c each having the rectangular cylindrical shape with the center axes being shifted from each other are continuously formed through the connecting wire 4b, can be obtained by edgewise winding of the single rectangular wire 3. Therefore, with the winding device 1 according to this embodiment, neither the size of the winding device 1 nor the area for installation of the winding device 1 is increased.

Embodiments of this invention were described above, but the above embodiments are merely examples of applications of this invention, and the technical scope of this invention is not limited to the specific constitutions of the above embodiments.

This application claims priority based on Japanese Patent Application No. 2012-133662 filed with the Japan Patent Office on Jun. 13, 2012, the entire contents of which are incorporated into this specification.

What is claimed is:

1. A winding device for an edgewise coil including a first coil portion having a cylindrical shape and a second coil portion having a cylindrical shape connected to the first coil portion through a connecting wire, comprising:
 a bending mechanism for bending, in a direction within a horizontal plane, a rectangular wire fed from a wire supply source in a horizontal direction;
 a feed mechanism for feeding a preset length of the rectangular wire from the wire supply source toward the bending mechanism;
 a coil guide for supporting an edgewise coil, from below, the edgewise coil being formed by alternately repeating the feeding operation for the rectangular wire by the feed mechanism and the bending operation for the rectangular wire by the bending mechanism, the edgewise coil being lowered under its own weight; and
 a coil-guide moving mechanism for moving the coil guide following movement of the edgewise coil by the feeding operation of the feed mechanism, and for moving the coil guide while rotating the coil guide following the movement of the edgewise coil by the bending operation of the bending mechanism,
 wherein the coil guide comprises:
  a guide column to be brought into engagement with an inner circumference of the first coil portion;
  a base plate on which the guide column stands vertically;
  a guide base which is provided on the base plate so that an upper surface of the guide base is located above an upper surface of the base plate, the second coil portion being to be placed on the upper surface of the guide base.

2. A winding device for an edgewise coil according to claim 1,
 wherein the coil-guide moving mechanism comprises a coil-guide vertically-moving mechanism for moving up and down the coil guide.

3. A winding method for an edgewise coil, comprising:
 a first coil formation step of alternately repeating an operation of feeding a rectangular wire from a wire supply source and an operation of bending the rectangular wire to form a first coil portion having a cylindrical shape;
 a connecting-wire formation step of forming a connecting wire from a part of the rectangular wire, which is fed from the wire supply source after the formation of the first coil portion; and a second coil formation step of sequentially bending a part of the rectangular wire, which is fed from the wire supply source after the formation of the connecting wire, in the same direction to form a second coil portion having a cylindrical shape connected to the first coil portion through the connecting wire, wherein:

the first coil formation step comprises supporting the first coil portion by a guide column to be brought into engagement with an inner circumference of the first coil portion to move in synchronization with the formation of the first coil portion; and the second coil formation step comprises placing the second coil portion on a guide base that moves together with the guide column so as to move the guide base in synchronization with the formation of the second coil portion.

4. A winding method for an edgewise coil according to claim 3, wherein the second coil formation step further comprises sequential downward movement of the guide base with the formation of the second coil portion.

\* \* \* \* \*